(12) United States Patent
Kishiyama et al.

(10) Patent No.: US 10,972,167 B2
(45) Date of Patent: Apr. 6, 2021

(54) USER APPARATUS, BASE STATION, AND COMMUNICATION METHOD

(71) Applicant: NTT DOCOMO, INC., Tokyo (JP)

(72) Inventors: Yoshihisa Kishiyama, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/557,354

(22) Filed: Aug. 30, 2019

(65) Prior Publication Data

US 2020/0036420 A1 Jan. 30, 2020

Related U.S. Application Data

(63) Continuation of application No. 15/558,461, filed as application No. PCT/JP2016/058101 on Mar. 15, 2016, now abandoned.

(30) Foreign Application Priority Data

Mar. 16, 2015 (JP) .................................. 2015-052709

(51) Int. Cl.
*H04B 7/04* (2017.01)
*H04B 7/06* (2006.01)
(Continued)

(52) U.S. Cl.
CPC ........... *H04B 7/063* (2013.01); *H04B 7/0417* (2013.01); *H04B 7/0632* (2013.01);
(Continued)

(58) Field of Classification Search
CPC .. H04B 7/0417; H04B 7/0617; H04B 7/0632; H04B 7/063; H04B 7/0695; H04B 17/24; H04B 7/088; H04B 7/086
(Continued)

(56) References Cited

U.S. PATENT DOCUMENTS

2002/0039912 A1 4/2002 Yamaguchi et al.
2004/0185893 A1 9/2004 Doi et al.
(Continued)

FOREIGN PATENT DOCUMENTS

CN 101978661 A 2/2011
CN 102684850 A 9/2012
(Continued)

OTHER PUBLICATIONS

International Search Report issued in PCT/JP2016/058101 dated May 24, 2016 (1 page).
(Continued)

*Primary Examiner* — Emmanuel Bayard
(74) *Attorney, Agent, or Firm* — Osha Bergman Watanabe & Burton LLP

(57) ABSTRACT

A user apparatus communicating with a base station in a radio communication system including the base station and the user apparatus includes a first receiving unit to receive multiple first reference signals transmitted from the base station; a detection unit to detect a specific antenna port via which the plurality of first reference signals is received, or a specific directivity pattern, among a plurality of directivity patterns generated by a plurality of antenna ports, in which the plurality of first reference signals are received; a measuring unit to measure reception power of each of the first reference signals; and a transmission unit to group the reception power of each of the first reference signals into one of groups of the specific antenna port and the specific directivity pattern via which the first reference signals are received to transmit the groups of the reception power to the base station.

6 Claims, 21 Drawing Sheets

(51) Int. Cl.
    *H04W 16/28*     (2009.01)
    *H04B 17/24*     (2015.01)
    *H04W 24/10*     (2009.01)
    *H04B 17/318*     (2015.01)
    *H04B 7/0417*     (2017.01)
    *H04B 7/08*     (2006.01)
    *H04B 7/0413*     (2017.01)

(52) U.S. Cl.
    CPC .......... *H04B 7/0695* (2013.01); *H04B 7/088* (2013.01); *H04B 17/24* (2015.01); *H04B 17/318* (2015.01); *H04W 16/28* (2013.01); *H04W 24/10* (2013.01); *H04B 7/0413* (2013.01); *H04B 7/0619* (2013.01); *H04B 7/086* (2013.01)

(58) Field of Classification Search
    USPC .................................. 375/267, 299, 347, 349
    See application file for complete search history.

(56) References Cited

U.S. PATENT DOCUMENTS

| | | |
|---|---|---|
| 2006/0116092 A1 | 6/2006 | Uno et al. |
| 2007/0123252 A1* | 5/2007 | Tronc ................. H04B 7/18591 |
| | | 455/427 |
| 2007/0159315 A1 | 7/2007 | Murata et al. |
| 2007/0173208 A1 | 7/2007 | Nishio et al. |
| 2008/0273609 A1 | 11/2008 | Murakami et al. |
| 2010/0151865 A1 | 6/2010 | Camp, Jr. et al. |
| 2013/0059619 A1* | 3/2013 | Kim ..................... H04W 72/046 |
| | | 455/509 |
| 2013/0107977 A1 | 5/2013 | Lakkis |
| 2013/0235742 A1 | 9/2013 | Josiam et al. |
| 2013/0288730 A1* | 10/2013 | Gomadam ............. H04B 7/024 |
| | | 455/509 |
| 2014/0120934 A1* | 5/2014 | Kishiyama .......... H04W 56/001 |
| | | 455/452.1 |
| 2014/0146863 A1 | 5/2014 | Seol et al. |
| 2014/0192917 A1 | 7/2014 | Nam et al. |
| 2014/0198681 A1 | 7/2014 | Jung et al. |
| 2014/0198747 A1 | 7/2014 | Ouchi et al. |
| 2014/0254701 A1 | 9/2014 | Geirhofer et al. |
| 2014/0307654 A1 | 10/2014 | Kim |
| 2015/0049824 A1* | 2/2015 | Kim ..................... H04B 7/0456 |
| | | 375/267 |
| 2015/0133173 A1 | 5/2015 | Edge et al. |
| 2015/0204964 A1 | 7/2015 | Hirano et al. |
| 2015/0215856 A1* | 7/2015 | Kim ..................... H04W 24/08 |
| | | 370/252 |
| 2015/0282123 A1* | 10/2015 | Miao ..................... H04W 48/00 |
| | | 455/450 |
| 2016/0006122 A1 | 1/2016 | Seol et al. |
| 2016/0013984 A1* | 1/2016 | Sun ..................... H04L 41/0866 |
| | | 370/252 |
| 2016/0028519 A1* | 1/2016 | Wei ..................... H04B 7/0639 |
| | | 375/267 |
| 2017/0201898 A1* | 7/2017 | Park ..................... H04L 5/0048 |
| 2017/0302346 A1* | 10/2017 | Jeong .................. H04B 7/0478 |

FOREIGN PATENT DOCUMENTS

| | | |
|---|---|---|
| EP | 2387162 A2 | 11/2011 |
| JP | 2002-185236 A | 6/2002 |
| JP | 2006-148928 A | 6/2006 |
| JP | 2013-219507 A | 10/2013 |
| WO | 2012/124552 A1 | 9/2012 |
| WO | 2014023727 A1 | 2/2014 |

OTHER PUBLICATIONS

Written Opinion of the International Searching Authority issued in PCT/JP2016/058101 dated May 24, 2016 (4 pages).
Extended European Search Report issued in the counterpart European Patent Application No. 16764957.3, dated Oct. 16, 2018 (11 pages).
Office Action issued in the counterpart European Patent Application No. 16764957.3, dated May 7, 2019 (12 pages).
Notice of Reasons for Refusal issued in Japanese Application No. 2017-506558, dated Apr. 7, 2020 (5 pages).
Office Action issued in Chinese Application No. 201680015994.1, dated Apr. 3, 2020 (28 pages).
Office Action issued in the counterpart Japanese Patent Application No. 2017-506558, dated Oct. 27, 2020 (5 pages).
Office Action issued in Chinese Application No. 201680015994.1, dated Sep. 30, 2020 (9 pages).
Extended European Search Report issued in European Application No. 20197751.9, dated Nov. 30, 2020 (11 pages).

\* cited by examiner

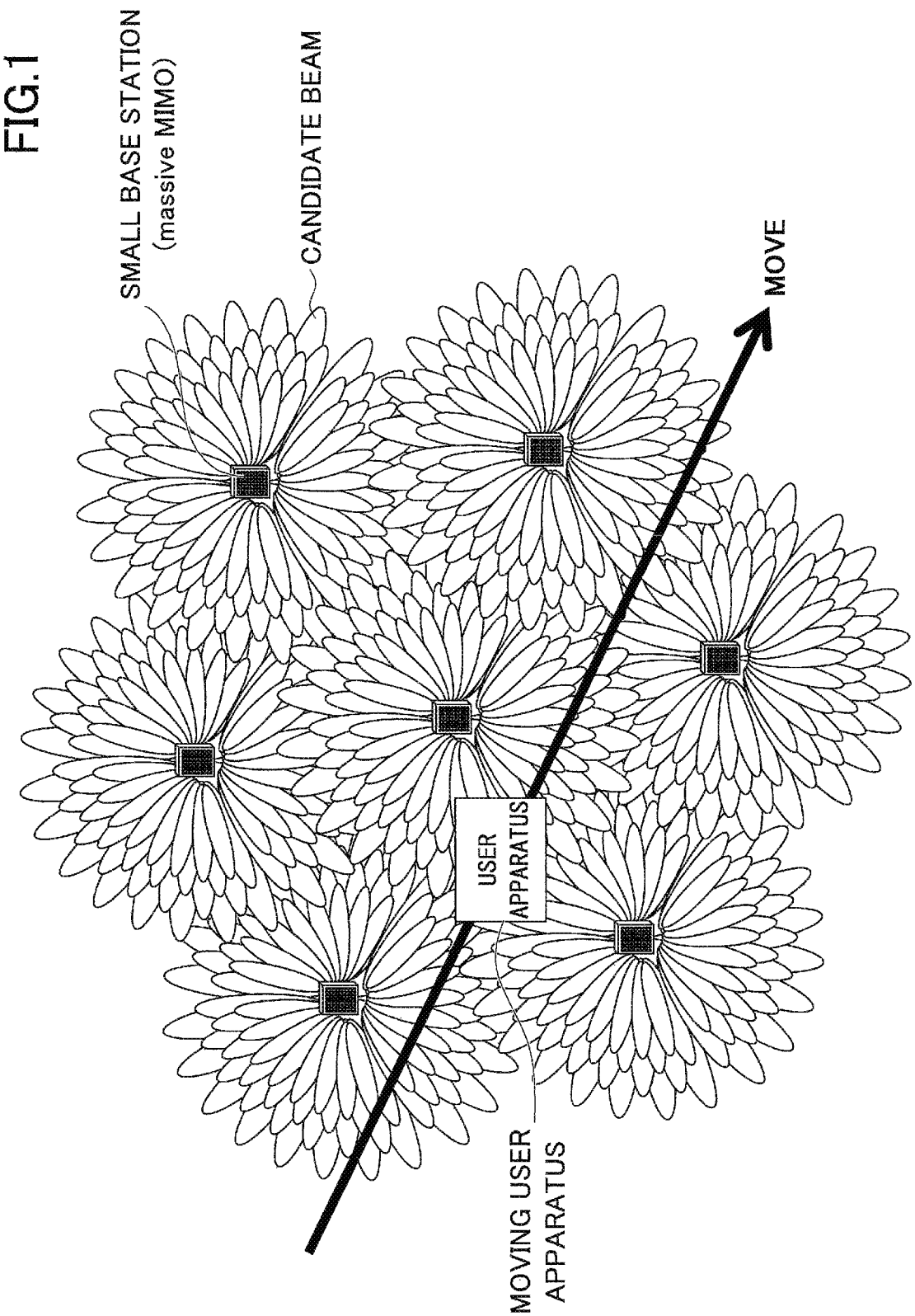

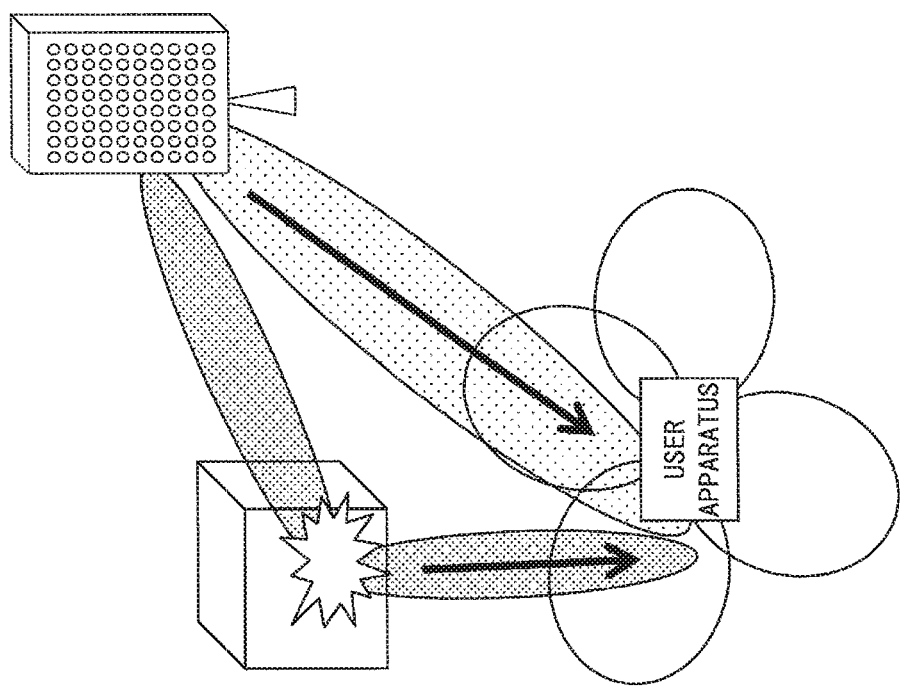
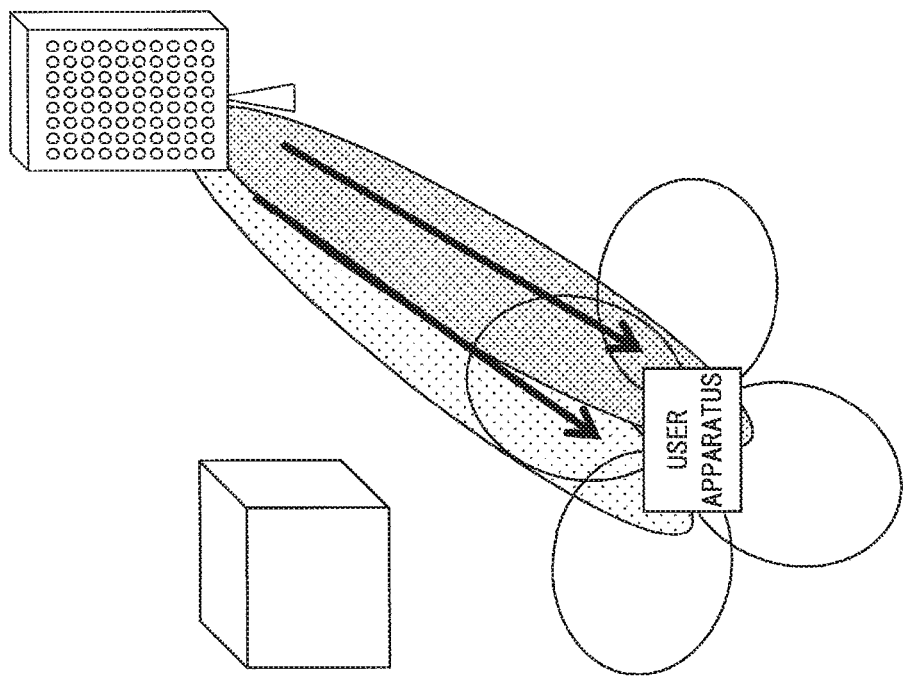

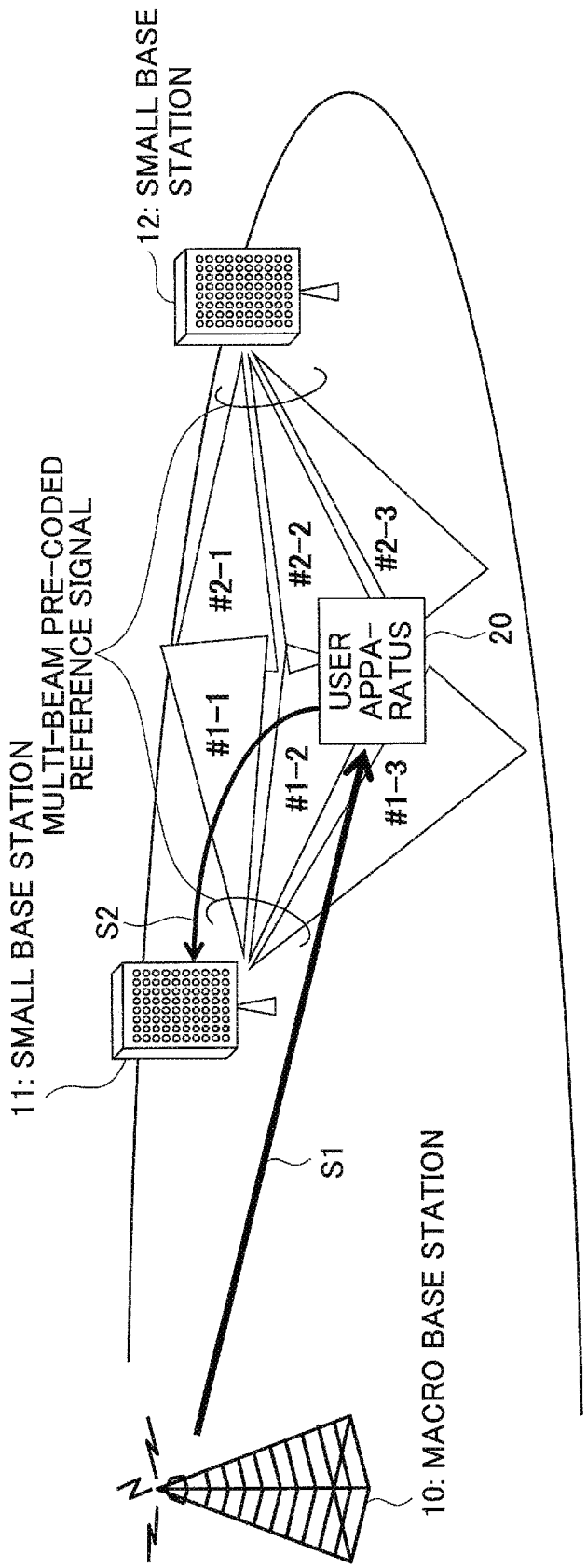

FIG.14

| FORMAT INFORMATION | BEAM ID,RSRP | ...... | BEAM ID,RSRP | CRC (UEID) |

FIG. 15A

| NUMBER OF BEAM SETS | NUMBER OF BEAMS IN BEAM SET #1 | NUMBER OF BEAMS IN BEAM SET #2 | ...... | NUMBER OF BEAMS IN BEAM SET #N |

FIG. 15B

| NUMBER OF BEAMS IN BEAM SET #1 | NUMBER OF BEAMS IN BEAM SET #2 |

FIG. 15C

| TOTAL NUMBER OF BEAMS | NUMBER OF BEAMS IN BEAM SET #1 |

FIG. 15D

| NUMBER OF BEAM SETS | TOTAL NUMBER OF BEAMS |

FIG.16

| FORMAT INFORMATION | BEAM SET ID | BEAM ID,RSRP | ...... | BEAM SET ID | BEAM ID,RSRP | CRC (UEID) |

FIG. 17A

| TOTAL NUMBER OF BEAMS |
|---|
| |

FIG. 17B

| TOTAL NUMBER OF BEAMS | NUMBER OF BEAM SETS |
|---|---|
| | |

FIG. 18A

| FORMAT INFORMATION | RADIO RESOURCE ALLOCATION INFORMATION |
|---|---|
| | |

FIG. 18B

| BEAM ID,RSRP | BEAM ID,RSRP | ...... | BEAM ID,RSRP | CRC (UEID) |
|---|---|---|---|---|

FIG. 20A

| FORMAT INFORMATION | RADIO RESOURCE ALLOCATION INFORMATION |

FIG. 20B

| FORMAT INFORMATION | BEAM SET ID | BEAM ID, RSRP |

......

| BEAM SET ID | BEAM ID, RSRP | CRC (UEID) |

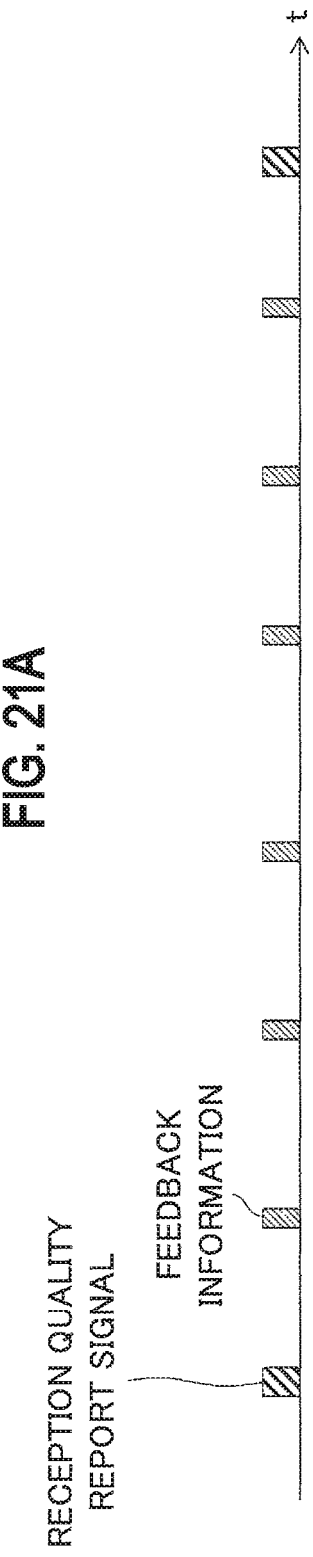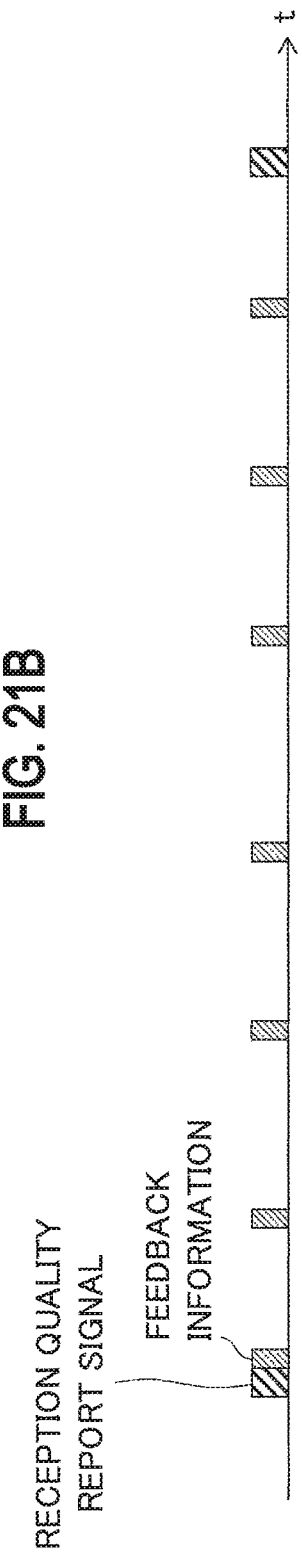

FIG. 22A

| REPORT PATTERN | NUMBER OF BEAM SETS | NUMBER OF BEAMS IN BEAM SET #1 | NUMBER OF BEAMS IN BEAM SET #2 | · · · · · · | NUMBER OF BEAMS IN BEAM SET #N |
|---|---|---|---|---|---|

FIG. 22B

| REPORT PATTERN | NUMBER OF BEAMS IN BEAM SET #1 | NUMBER OF BEAMS IN BEAM SET #2 |
|---|---|---|

FIG. 22C

| REPORT PATTERN | TOTAL NUMBER OF BEAMS | NUMBER OF BEAMS IN BEAM SET #1 |
|---|---|---|

FIG. 22D

| REPORT PATTERN | NUMBER OF BEAM SETS | TOTAL NUMBER OF BEAMS |
|---|---|---|

FIG. 23A

| REPORT PATTERN | TOTAL NUMBER OF BEAMS |
|---|---|

FIG. 23B

| REPORT PATTERN | TOTAL NUMBER OF BEAMS | NUMBER OF BEAM SETS |
|---|---|---|

USER APPARATUS, BASE STATION, AND COMMUNICATION METHOD

CROSS-REFERENCE TO RELATED APPLICATIONS

The present application is a continuation application and, thereby, claims benefit under 35 U.S.C. § 120 to U.S. patent application Ser. No. 15/558,461 filed on Sep. 14, 2017, titled, "USER APPARATUS, BASE STATION, AND COMMUNICATION METHOD," which is a national stage application of PCT Application No. PCT/JP2016/058101, filed on Mar. 15, 2016, which claims priority to Japanese Patent Application No. 2015-052709 filed on Mar. 16, 2015. The contents of the priority applications are incorporated by reference in their entirety.

TECHNICAL FIELD

The present invention relates to a user apparatus, a base station, and a communication method.

BACKGROUND ART

In LTE/LTE-Advanced, MIMO (multiple-input and multiple-output) technology that increases system capacity, cell edge user throughput, and the like is employed. In addition, a heterogeneous network technology that achieves high quality communication by reducing intercell interference while mixing different types of base stations (macrocells, small cells, etc.) has been studied.

Specifically, it is assumed that high frequency bands are used in small cells in heterogeneous networks. Note that propagation loss increases in high frequency bands. Hence, in order to compensate for such a propagation loss increase, application of massive MIMO that performs beam forming with a narrow beam width has been studied. In addition, massive MIMO has attracted attention as element technology in Fifth generation (5G) radio technology.

Massive MIMO is a large-scale MIMO with a large number (e.g., 100 elements) of antennas installed on the base station, which enables strength of the electric field to concentrate in a narrow area to reduce interference between users as a result.

RELATED ART DOCUMENTS

Patent Document

[Patent Document 1] Japanese Unexamined Patent Publication No. 2013-219507

SUMMARY OF THE INVENTION

Problem to be Solved by the Invention

FIG. 1 is a diagram illustrating an example of a communication environment that includes a large number of small cells to which massive MIMO is applied. As illustrated in FIG. 1, a large number of beams are transmitted from a base station of each small cell. In a case where a user apparatus (UE) communicates while moving in such an environment, a user apparatus selects a specific beam adapted to a current position and performs communication while sequentially switching the beams according to its movement. In addition, it is possible to perform MIMO communication by simultaneously using multiple beams formed by massive MIMO. In order to achieve such an operation, it is necessary for a user apparatus and a base station to determine multiple beams as candidates for communication by MIMO.

FIGS. 2A and 2B are diagrams illustrating a problem to be solved by the invention. In an example of FIG. 2A, a user apparatus receives two beams transmitted from a base station having a large number of antenna elements from the same direction. By contrast, in an example of FIG. 2B, a user apparatus receives two beams transmitted from a base station from different directions.

Note that in order to improve quality of communication by MIMO, it is desirable to have a lower correlation between channels constituting MIMO. That is, in a case where the user apparatus simultaneously uses multiple beams to perform MIMO transmission, it is desirable to perform MIMO transmission using multiple beams received from different directions as illustrated in FIG. 2B compared to performing MIMO transmission using multiple beams received from the same direction as illustrated in FIG. 2A.

The disclosed technology has been developed in view of the above-described point, and an object is to provide a technique for use in a radio communication system having a base station performing beam forming and a user apparatus, which enables appropriately selecting multiple beams used for communication, from among multiple beams formed by the base station.

Means for Solving the Problem

A user apparatus according to the disclosed technique is a user apparatus communicating with a base station of a radio communication system that includes the base station and the user apparatus, wherein the user apparatus includes a first receiving unit configured to receive a plurality of first reference signals transmitted from the base station; a detection unit configured to detect a specific antenna port via which the plurality of first reference signals is received, or a specific directivity pattern, among a plurality of directivity patterns generated by a plurality of antenna ports, in which the plurality of first reference signals are received; a measuring unit configured to measure reception power of each of the plurality of first reference signals; and a transmission unit configured to group the reception power of each of the plurality of first reference signals into one of groups of the specific antenna port and the specific directivity pattern via which the plurality of first reference signals are received to transmit the groups of the reception power to the base station.

Effect of the Present Invention

The disclosed technology may provide a technology, in a radio communication system having a base station performing beam forming and a user apparatus, capable of appropriately selecting a plurality of beams used for communication, among a plurality of beams formed by the base station.

BRIEF DESCRIPTION OF THE DRAWINGS

FIG. 1 is a diagram illustrating an example of a communication environment that includes a large number of small cells to which massive MIMO is applied;

FIG. 2A and FIG. 2B are diagrams illustrating a problem to be solved by the invention;

FIG. 3 is a diagram illustrating an overall configuration of a radio communication system according to an embodiment;

FIG. 14 is a diagram illustrating an example of a configuration of a reception quality report signal;

FIG. 15A, FIG. 15B, FIG. 15C, and FIG. 15D include diagrams illustrating an example of format information;

FIG. 16 includes diagrams illustrating an example of a modification of a configuration of the reception quality report signal;

FIG. 17A and FIG. 17B include diagrams illustrating an example of a modification of the format information;

FIG. 18A and FIG. 18B include diagrams illustrating an example of a signal in a case where format information is reported from a base station;

FIG. 20A and FIG. 20B include diagrams illustrating an example of a modification (part 2) of a signal in a case where format information is reported from a base station;

FIG. 21A and FIG. 21B include diagrams illustrating a method for transmitting a reception quality report signal and feedback information;

FIG. 22A, FIG. 22B, FIG. 22C, and FIG. 22D include diagrams illustrating an example of format information to which a report pattern is attached;

FIG. 23A and FIG. 23B include diagrams illustrating a modification of format information to which a report pattern is attached.

EMBODIMENTS FOR CARRYING OUT THE INVENTION

Figure 4:
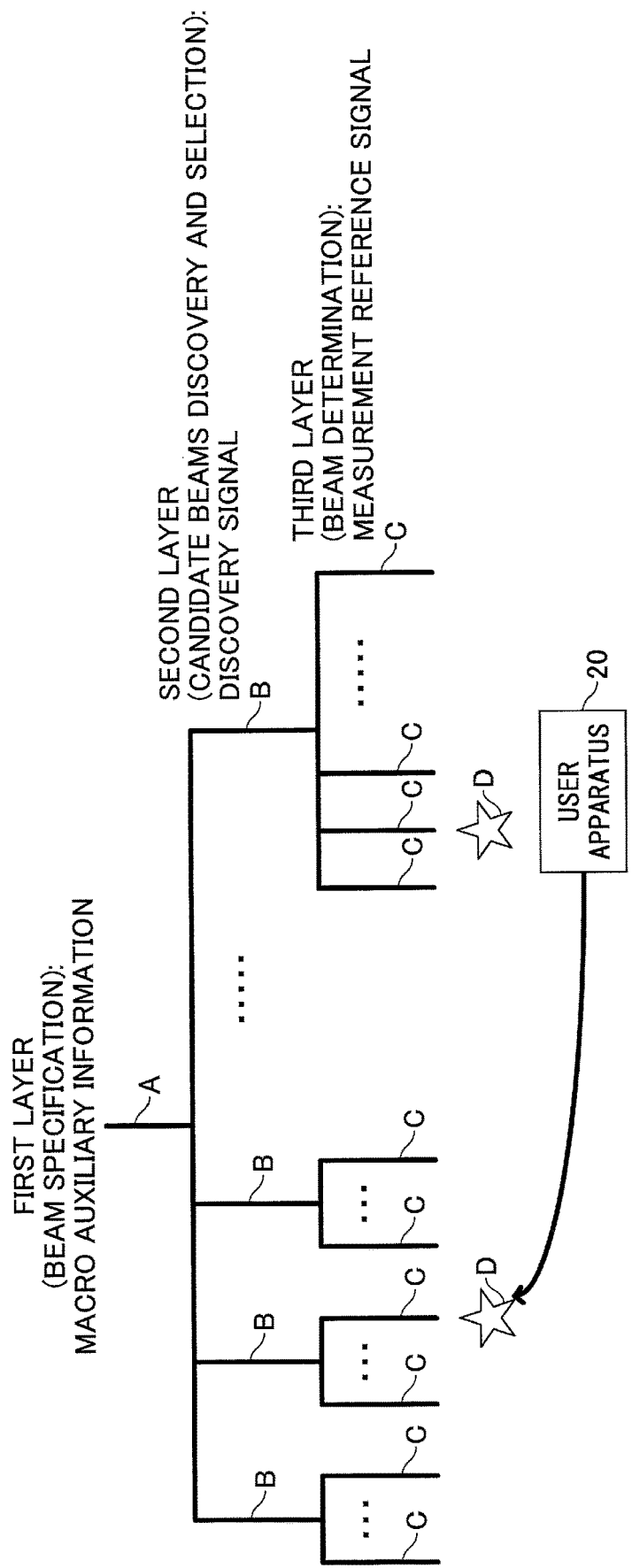
FIG. 4 is a diagram illustrating a configuration of a beam used for communication and each reference signal; signal.

The following describes embodiments of the present invention with reference to the accompanying drawings. Note that the embodiments described below are merely examples and the embodiments to which the present invention is applied are not limited to the following embodiments. For example, it is assumed that a radio communication system according to an embodiment complies with LTE standards. However, the present invention may be applied not limited to LTE but also be applied to other systems. Note that, in the specification and the claims, the term "LTE" is used not only to mean a communication scheme corresponding to 3GPP release 8 or 9, but also to mean the communication system corresponding to 3GPP release 10, 11, 12, 13, 14 or later.

Although a configuration of a reference signal of three hierarchies is basically illustrated as an example in the present embodiment, the number of hierarchies is not limited to three, and the number of hierarchies may be two, or the number of hierarchies may be four or more.

<Outline>

(Overall Configuration of Radio Communication System)

FIG. 3 illustrates an overall configuration diagram of a radio communication system according to an embodiment. The radio communication system according to the present embodiment includes a macro base station 10 forming a macrocell and small base stations 11 and 12 in a coverage area of the macrocell. In addition, FIG. 3 illustrates a user apparatus 20 communicating with the macro base station 10, the small base stations 11 and 12, and the like.

In the radio communication system, macro coverage is secured by the macro base station 10 with a low frequency band, and the small base stations 11 and 12 absorb traffic of a small area (e.g., hot spot) with a high frequency band; however, the allocation of such frequency bands is merely an example, and the allocation of such frequency bands is thus not limited to this example.

The macro base station 10, and the small base stations 11 and 12 communicate with the user apparatus 20 via radio. Each of the macro base station 10 and the small base stations 11 and 12 is configured to include hardware resources including a CPU such as one or more processors, a memory device including a ROM, a RAM or a flash memory, an antenna for communicating with the user apparatus 20 or the like, and a communication interface device for communicating with an adjacent base station, a core network and the like. Respective functions and processes of the macro base station 10 and the small base stations 11 and 12 may be implemented by causing the processors to process or executing data and programs stored in the memory device. However, the macro base station 10 and the small base stations 11 and 12 are not limited to the above-described hardware configuration, and may have any other appropriate hardware configuration.

The user apparatus 20 has a function to communicate with the macro base station 10, the small base stations 11 and 12, the core network, and the like through radio. The user apparatus 20 may, for example, be a mobile phone, a smartphone, a tablet, a mobile router, a wearable terminal, or the like. The user apparatus 20 may be any user apparatus 20 insofar as the user apparatus 20 has a communication function. The user apparatus 20 is configured to include hardware resources including a CPU such as one or more processors, a memory device such as a ROM, a RAM, or a flash memory, an antenna for communicating with the macro base station 10 and the small base stations 11 and 12, and an RF (Radio Frequency) device. Respective functions and processes of the user apparatus 20 may be implemented by causing the processors to process or execute the programs and data stored in the memory device. However, the user apparatus 20 is not limited to the above-described hardware configuration; the user apparatus 20 may have any other appropriate hardware configuration.

The small base stations 11 and 12 in the present embodiment have the function of massive MIMO such that the small base stations 11 and 12 may be enabled to form various beams from a wide beam to a narrow beam. As illustrated in FIG. 3, according to the present embodiment, multiple pre-coded reference signals of different types are transmitted by beams from each of the small base stations. Note that a reference signal being "pre-coded" indicates that, in a transmission example, a transmission signal is multiplied by the weight for each antenna port such that the reference signal is transmitted with a beam having a certain width. For example, in the example illustrated in FIG. 3, a reference signal is transmitted from the small base station 11 with beam 1-1, beam 1-2, and beam 1-3, respectively. Further, a reference signal is transmitted from the small base station 12 with beam 2-1, beam 2-2, and beam 2-3, respectively.

In a coverage area of the macrocell, the user apparatus 20 receives Macro-Assisted Information from the macro base station 10 (step S1), and the user apparatus 20 monitors, by using macro auxiliary information, a reference signal (this signal is referred to as a "Discovery Signal") transmitted with beams of the small base stations 11 and 12 to receive (detect) a specific discovery signal.

In this case, it is assumed that the user apparatus 20 has received a discovery signal transmitted with each beam of the small base station 11. The user apparatus 20 measures reception quality (reception power, etc.) based on the received discovery signal and transmits a measured result of the reception quality to the small base station 11 (step S2). The small base station 11 determines, based on a measurement report (a report of the measured result), for example, the beam with which the user apparatus 20 has successfully received a signal with the best quality (e.g., the highest reception power), and transmits a reference signal (hereinafter referred to as a "measurement reference signal") with the determined beam. The user apparatus 20 measures the reception quality based on the measurement reference signal and generates feedback information (CSI (Channel State Information) or the like) to be reported to the small base station 11, and transmits the generated CSI to the small base station 11.

Based on the feedback information received from the user apparatus 20, the small base station 11 allocates radio resources for transmitting data signals (PDSCH and the like) to the user apparatus 20.

As described above, the user apparatus 20 may be enabled to receive the data signal from the small base station 11 by sequentially performing a step of selecting candidate beams to be used for communication by using a discovery signal, a step of determining a beam of the best quality, from the selected candidate beams, as a beam to be used for communication, and a step of allocating the radio resources based on the feedback information with respect to the determined beam.

(Beam Identification Method)

Next, a description will be given, with reference to FIGS. 4 and 5, of a method for specifying a beam used for communication in the radio communication system according to the present embodiment.

FIG. 4 is a diagram illustrating a configuration of a beam used for communication and each reference signal. FIG. 5 is a diagram illustrating a configuration of a beam used for communication.

As illustrated in FIG. 4, the reference signal in this embodiment has a hierarchical structure. That is, the user apparatus 20 sequentially refers to a reference signal of a lower hierarchy from a reference signal of a higher hierarchy to detect an optimal beam, among multiple beams transmitted from the small base stations 11 and 12, which enables the user apparatus 20 to receive a desired data signal with the optimal beam. By employing such a hierarchical structure, candidate beams may be efficiently extracted without searching for a very large number of beam reference signals of the corresponding beams. Accordingly, it is possible to quickly detect or switch the optimum beam.

More specifically, in the example illustrated in FIG. 4, macro auxiliary information is provided as a first layer (First Layer). As described above, the macro auxiliary information is transmitted from the macro base station 10 to the user apparatus 20 within the macro coverage, and the user apparatus 20 receives the discovery signal using the macro auxiliary information.

The macro auxiliary information includes, for example, information (timing, frequency, etc.) of a radio resource by which a discovery signal is transmitted, discovery signal sequence information, and the like. The channel via which the macro base station 10 transmits the macro auxiliary information is not limited to a specific type of channel, and may be transmitted using, for example, a control channel, a broadcast channel, or a data channel defined by LTE.

The radio communication system includes multiple macro base stations, and the user apparatus 20 may be enabled to obtain, by referring to the macro auxiliary information, information about the discovery signal to be searched for and to have high possibility of being received within the macrocell in which the user apparatus 20 is located. That is, the user apparatus 20 may be enable to specify a branch A in FIG. 4 by referring to the macro auxiliary information. Since the macro auxiliary information is a signal being referred to (Referenced) by the user apparatus 20, the macro auxiliary information may be called a type of reference signal.

In the example illustrated in FIG. 4, a discovery signal is provided as a second hierarchy (Second Layer). The discovery signal is a precoded signal that is transmitted from the small base stations 11 and 12 with both a beam transmitted with a wide width (hereinafter referred to as a "wide beam") and a beam transmitted with a width narrower than the wide beam (hereinafter referred to as a "narrow beam". The wide beam indicates multiple beams transmitted in a relatively wide range as illustrated, for example, on the left side of FIG. 5. The narrow beam indicates multiple beams transmitted with a width narrower than that of the wide beam as illustrated, for example, in the center of and on the right side of FIG. 5.

A discovery signal is transmitted from each of the small base stations 11 and 12 in each of multiple wide beams and multiple narrow beams, and the user apparatus 20 monitors and receives (detects) the discovery signal included in the wide beam based on the macro auxiliary information. Upon detecting the discovery signal included in the wide beam, the user apparatus 20 subsequently searches for a discovery signal corresponding to a narrow beam. Upon receiving (detecting) the discovery signal corresponding to the narrow beam, the user apparatus 20 measures the reception quality (reception power, etc.) of the discovery signal corresponding to the detected one or more narrow beams and transmits the measured result to the base stations. In this embodiment, unless otherwise specified, the term "reception quality" is used to include "reception power" in a broad sense.

In the example of FIG. 4, for example, in the second hierarchy, the discovery signal included in the wide beam enables the selection of a branch B (branches Bs) residing in a lower hierarchy of the branch A (each branch B corresponds to a different wide beam). Likewise, the discovery signal included in the narrow beam enables the selection of a branch C (branches Cs) residing in a lower hierarchy of the corresponding branch B (each branch C corresponds to a different narrow beam). Further, in the example of FIG. 5, the branch of B corresponds to each of the wide beams depicted on the left side of FIG. 5, and the branch of C corresponds to each of the narrow beams illustrated in the center of FIG. 5.

Information (a signal sequence or the like) on the discovery signal is associated with each wide beam and each narrow beam. This information may be referred to as an "identifier". That is, the user apparatus 20 is configured to measure the reception quality (reception power, etc.) of a discovery signal associated with multiple different identifiers transmitted from the base stations. In the following description, an identifier associated with a wide beam is referred to as a "beam group ID", and an identifier associated with a narrow beam is referred to as a "beam ID". The wide beam may be uniquely identified with the beam group ID, and the narrow beam may be uniquely identified with the beam ID.

In the example illustrated in FIG. 4, a measurement reference signal is provided as a third hierarchy (Third Layer). A measurement reference signal is a signal transmitted from the small base stations 11 and 12 with a narrow beam. The small base stations 11 and 12 determine a narrow beam for transmitting a measurement reference signal based on the reception quality (reception power, etc.) of the discovery signal corresponding to one or more narrow beams reported from the user apparatus 20. For example, the small base stations 11 and 12 may be enabled to determine each of the narrow beams for transmitting measurement reference signals in the order from highest reception power to lowest reception power of discovery signals.

Subsequently, the small base stations 11 and 12 transmit measurement reference signals for each of the determined narrow beams. The user apparatus 20 receives each measurement reference signal, measures reception quality (reception power, etc.), and transmits feedback information (e.g., identification information of the measurement reference signal having the highest reception power, etc.) to the small base stations 11 and 12, respectively. The small base stations 11 and 12 that have received the feedback information, perform link adaptation, rank adaptation, scheduling, and the like with respect to a downlink data signal.

In the example illustrated in FIG. 4, when the small base station 11 selects two branches each indicated by "D" as narrow beams for transmitting measurement reference signals, the user apparatus 20 measures reception quality of the measurement reference signals included in the two narrow beams, and transmits feedback information to the small base station 11. The user apparatus 20 receives data signals transmitted from the small base station 11 via the two narrow beams. As illustrated on the right side of FIG. 5, the user apparatus 20 is configured to receive the data signals transmitted from the small base station 11 via two narrow beams (beams corresponding to respective Ds in FIG. 5).

Figure 5:
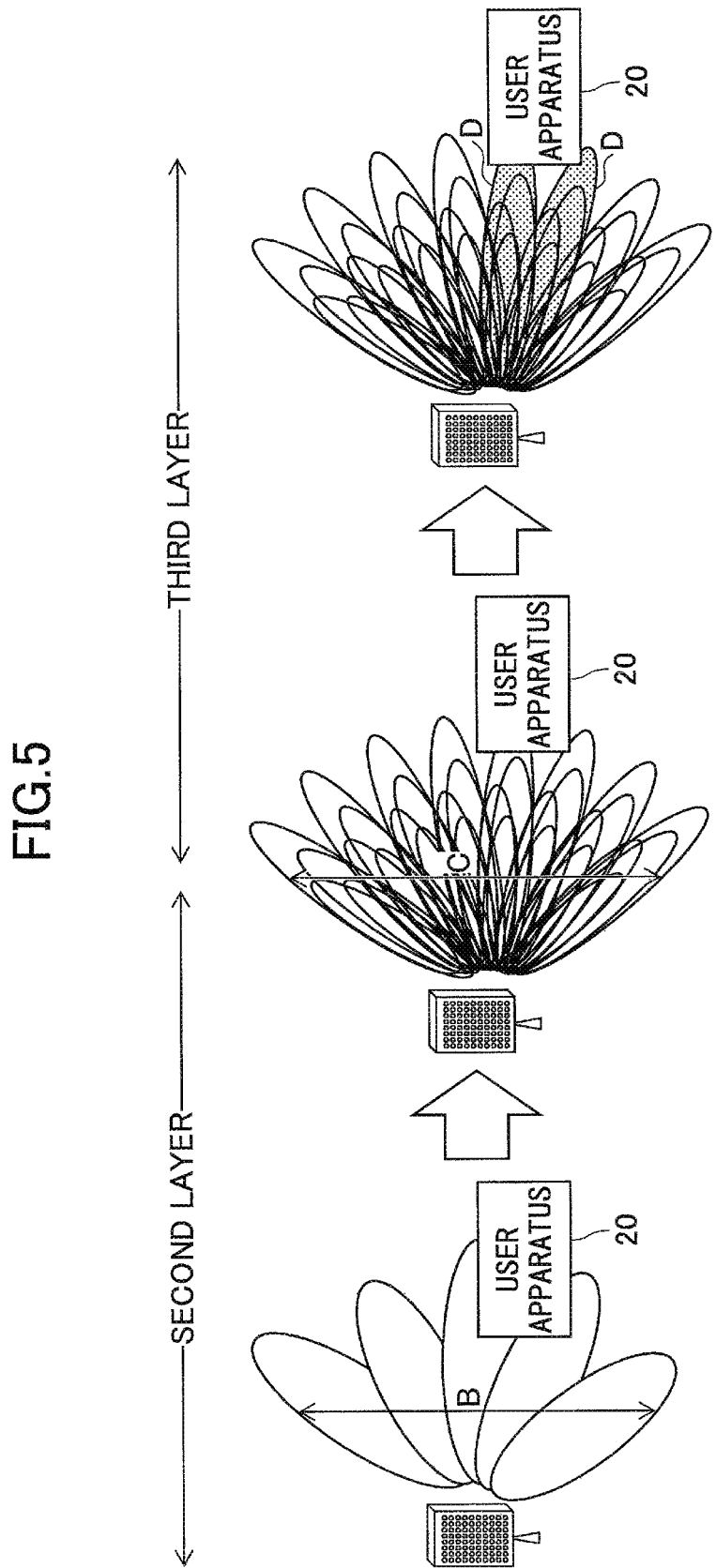
FIG. 5 is a diagram illustrating a configuration of a beam used for communication.

Note that the small base stations 11 and 12 may be configured to further select narrow beams used for communication with the user apparatus 20 based on the feedback information received from the user apparatus 20 (e.g., further select a narrow beam from the beams corresponding to respective Ds in FIG. 5).

(Configuration Example of Each Signal)

In the present embodiment, a discovery signal included in a wide beam may be used for the user apparatus 20 to synchronize with the small base stations 11 and 12. Hence, in the present embodiment, the discovery signal included in the wide beam may also be referred to as a "synchronization signal". For example, PSS (Primary Synchronization signal)/SSS (Secondary Synchronization signal) may each be used as a discovery signal included in a wide beam.

In the present embodiment, a discovery signal corresponding to a narrow beam may, for example, be a predetermined reference signal, because the user apparatus 20 is used to measure the reception quality for each narrow beam.

Figure 6:
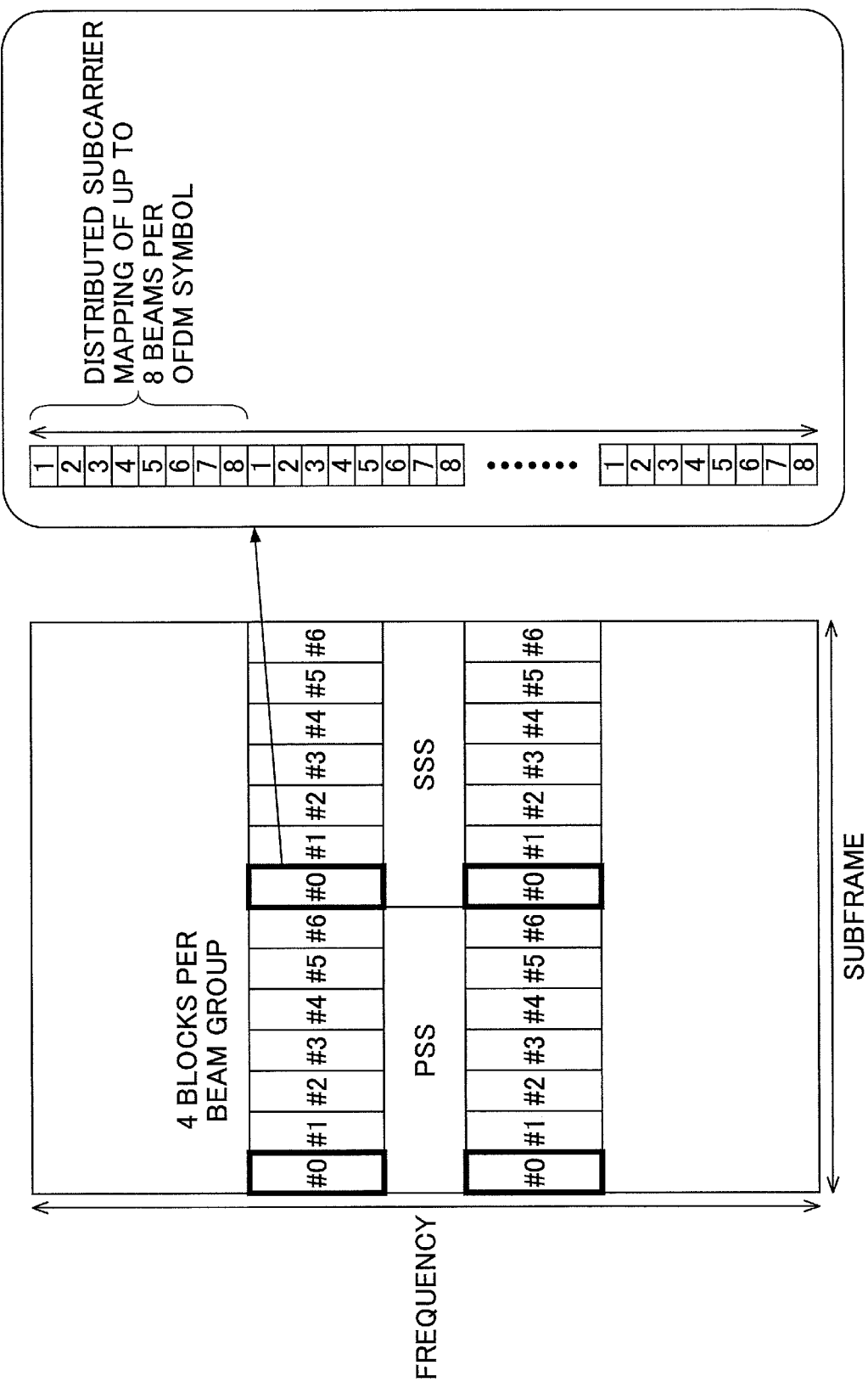
FIG. 6 is a diagram illustrating an example of mapping of discovery signals in an embodiment.

FIG. 6 is a diagram illustrating an example of mapping of discovery signals in an embodiment. As illustrated in FIG. 6, for example, PSS and SSS used as discovery signals included in the wide beams are mapped to the center of the system band, and the discovery signals corresponding to the narrow beams are mapped above and below PSS and SSS. In the example of FIG. 6, the discovery signals mapped above and below PSS and SSS have the same (signal) sequence.

An example of signal mapping in each block (a time length is 1 symbol) is depicted on the right side of FIG. 6. In the example on the right side of FIG. 6, the number indicates a beam (a discovery signal of the narrow beam) for transmitting a signal with the corresponding resource. In the example depicted on the right side of FIG. 6, the discovery signals of eight narrow beams are distributed and mapped to subcarriers. Note that the discovery signals in the embodiment are not limited to the example illustrated in FIG. 6. The discovery signals in the embodiment may employ a signal or a mapping method differing from those depicted in FIG. 6.

In the present embodiment, a CSI-RS (Channel State Information-Reference Signal) may be used as a measurement reference signal.

The outline of the mobile communication system according to the present embodiment has been described above with reference to FIGS. 4 to 6. In the embodiment, as illustrated above in the problem to be solved by the invention, in order to achieve communication by MIMO by simultaneously using multiple beams, narrow beams (corresponding to "Ds" in FIG. 5) may be selected so as to acquire a low correlation between the two narrow beams illustrated in FIGS. 4 and 5 (i.e., so as to spatially separate the two narrow beams). Specifically, when measuring the reception quality of the discovery signals associated with the narrow beams corresponding to the branch C in FIGS. 4 and 5, the user apparatus 20 identifies directions in which the narrow beams are received, groups the measured reception qualities into groups of the identified directions in which the narrow beams are received, and transmits the measured reception quality by each of the groups to the small base stations 11 and 12.

Further, when determining the narrow beams for transmitting the measurement reference signals, the small base stations 11 and 12 do not simply determine the multiple narrow beams in a descending order of reception quality, but determine the multiple narrow beams so as to distribute the determined narrow beams into groups of different directions. The low correlation between the multiple narrow beams used for communication may be acquired by determining the multiple narrow beams for transmitting the measurement reference signals in a manner described above. Hence, it is possible to improve throughput or the like by MIMO spatial multiplexing or space division multiplexing.

In the following description, the small base stations 11 and 12 are collectively referred to as a "small base station 11".

<Functional Configuration>
(User Apparatus)

Figure 7:
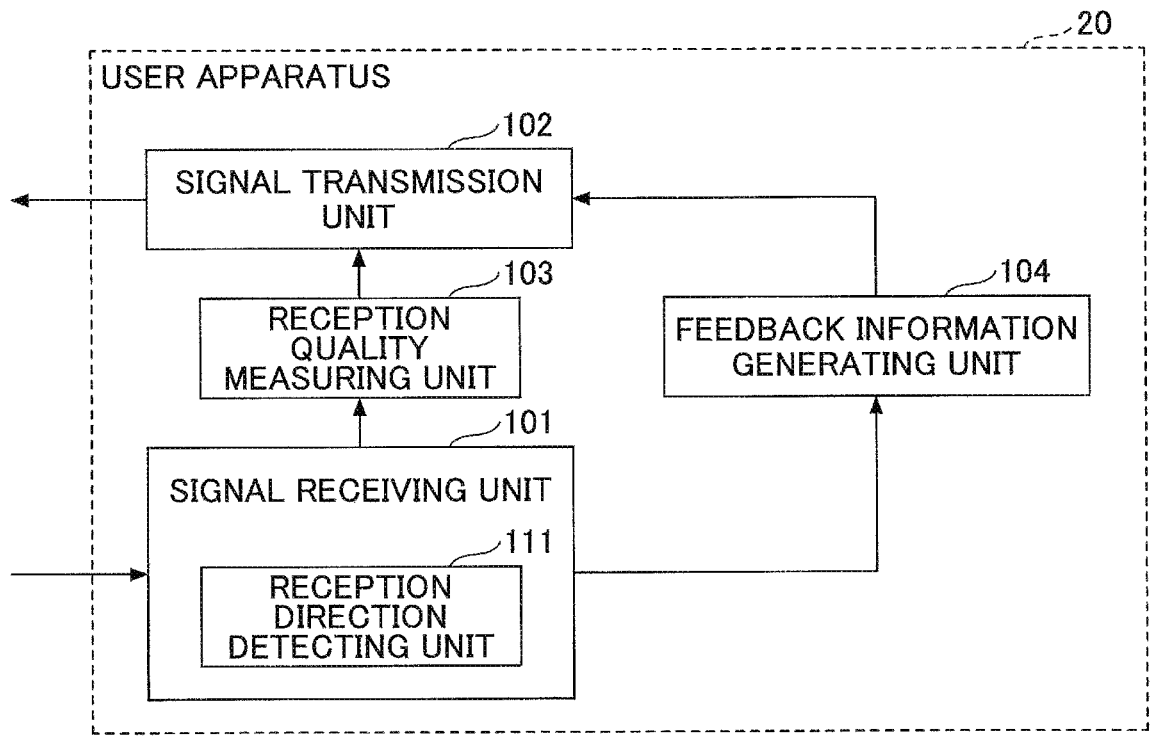
FIG. 7 is a diagram illustrating an example of a functional configuration of a user apparatus according to an embodiment.

FIG. 7 is a diagram illustrating an example of a functional configuration of a user apparatus according to an embodiment. As illustrated in FIG. 7, the user apparatus 20 includes a signal receiving unit 101, a signal transmission unit 102, a reception quality measuring unit 103, and a feedback information generating unit 104. The signal receiving unit 101 includes a reception direction detecting unit 111. FIG. 7 merely illustrates the functional configuration particularly related to the embodiment of the present invention in the user apparatus 20, and the user apparatus 20 may also include not-illustrated functions for performing operations at least in compliance with LTE. The functional configuration of the user apparatus 20 illustrated in FIG. 7 is merely an example. Any functional division and any names of the functional components may be applied insofar as operations according to the present embodiment may be executable.

The signal receiving unit 101 acquires information of an upper layer from wirelessly received signal(s) of a lower layer. The signal receiving unit 101 acquires macro auxiliary information from control signal(s) and the like received from the macro base station 10, stores the macro auxiliary information, and receives (detects), based on the stored macro auxiliary information, discovery signal(s) included in a wide beam transmitted from the small base station 11. Further, the signal receiving unit 101, for example, specifies a signal sequence simultaneously with performing symbol timing synchronization and radio frame synchronization using the discovery signals included in the wide beam, and receives (detects) discovery signal(s) corresponding to the narrow beam in accordance with the specified signal series. The signal receiving unit 101 also receives measurement reference signal(s) transmitted from the small base station 11.

The signal transmission unit 102 generates a signal of a lower layer from the information of the upper layer and transmits the generated signal of the lower layer wirelessly. Further, the signal transmission unit 102 transmits the reception quality measured by the reception quality measuring unit 103 to the small base station 11. Further, the signal transmission unit 102 transmits the feedback information generated by the feedback information generating unit 104 to the small base station 11.

The reception quality measuring unit 103 measures reception quality (reception power, etc.) of discovery(s) signal corresponding to a narrow beam. More specifically, the reception quality measuring unit 103 specifies a beam ID of each narrow beam from the discovery signals corresponding to the narrow beam, measures the reception quality of the narrow beam corresponding to the specified beam ID, and transmits the measured reception signal to the signal transmission unit 102. In addition, the reception quality measuring unit 103 acquires, from the reception direction detecting unit 111, a reception direction of the narrow beam, a specific directivity pattern in which the narrow beam is received, or a specific antenna port via which the narrow beam is received, or the like so as to obtain information on a reception direction of the narrow beam of which reception quality is to be measured. Note that the reception quality measuring unit 103 measures the reception quality (reception power or the like) of the discovery signals corresponding to the narrow beam, based on an instruction from the small base station 11 or at a predetermined period, and transmits the measured reception quality via the signal transmission unit 102 to the small base station 11.

The feedback information generating unit 104 generates feedback information based on a measured result obtained based on the measurement reference signals corresponding to the narrow beam, and transfers the generated feedback information to the signal transmission unit 102. The feedback information may include CSI such as Rank Indicator (RI), Precoding Matrix Indicator (PMI), Channel Quality Indicator (CQI), or the like. Note that the feedback information generating unit 104 may transfer the feedback information relating to all the narrow beams including the measurement reference signals to the signal transmission unit 102 or may transfer the feedback information on a predetermined number of narrow beams in a descending or an ascending order of the reception quality of the narrow beams to the signal transmission unit 102. Note that the feedback information generating unit 104 generates feedback information, based on an instruction from the small base station 11 or by measuring the measurement reference signal included in the narrow beam at a predetermined period, and transmits the generated feedback information via the signal transmission unit 102 to the small base station 11.

The reception direction detecting unit 111 forms a beam on a receiving side by using multiple antennas held by the user apparatus 20 to detect a direction in which the narrow beam is received. Further, the reception direction detecting unit 111 reports the detected direction of the detected narrow beam to the reception quality measuring unit 103. Forming a beam on the receiving side indicates that the received signal is multiplied by the weight for each antenna port of the user apparatus 20 to generate a directivity pattern such that a narrow beam is received with a certain width (i.e., with directivity). In addition, the reception direction detecting unit 111 may report to the reception quality measuring unit 103, a specific directivity pattern in which the narrow beam is received, instead of the reception direction of the narrow beam. The weight to be multiplied for each antenna port may be specified by a code book.

Further, the reception direction detecting unit 111 may be configured to detect the reception direction of the narrow beam by specifying, from among the multiple antenna ports included in the user apparatus 20, an antenna port via which the narrow beam is received. This is because it is also assumed that the reception direction may be specified by a shape of the physical antenna provided in the user apparatus 20. In such a case, the reception direction detecting unit 111 may report, instead of the reception direction of the narrow beam, a specific antenna port via which the narrow beam is received to the reception quality measuring unit 103.

(Small Base Station)

Figure 8:
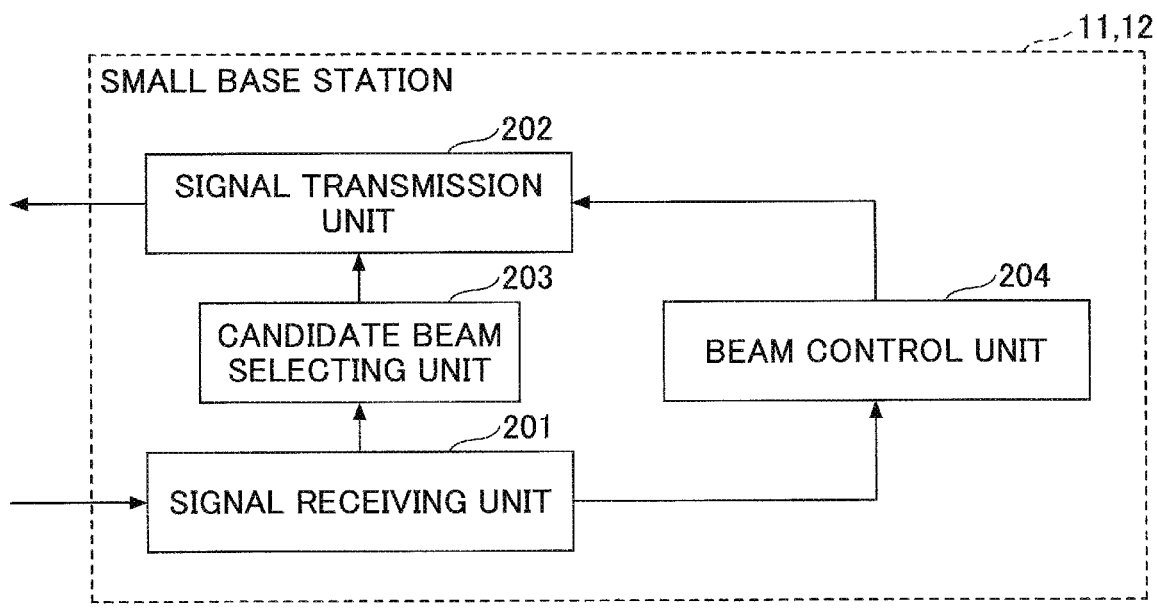
FIG. 8 is a diagram illustrating an example of a functional configuration of a small base station according to an embodiment.

FIG. 8 is a diagram illustrating an example of a functional configuration of a small base station according to an embodiment. As illustrated in FIG. 8, a small base station 11 includes a signal receiving unit 201, a signal transmission unit 202, a candidate beam selecting unit 203, and a beam control unit 204. FIG. 8 merely illustrates the functional configuration particularly related to the embodiment of the present invention in the small base station 11, and the small base station 11 may also include not-illustrated functions for performing operations at least in compliance with LTE. The functional configuration of the small base station 11 illustrated in FIG. 8 is merely an example. Any functional division and any names of the functional components may be applied insofar as operations according to the present embodiment may be executable.

The signal receiving unit 201 acquires information of an upper layer from wirelessly received signal(s) of a lower layer. In addition, the signal receiving unit 201 transfers, to the candidate beam selecting unit 203, the reception quality of each narrow beam received from the user apparatus 20. The signal receiving unit 201 also transfers, to the beam control unit 204, the feedback information of the narrow beam received from the user apparatus 20.

The signal transmission unit 202 generates a signal of a lower layer from the information of the upper layer and transmits the generated signal of the lower layer wirelessly. In addition, the signal transmission unit 202 transmits a radio signal so as to form a wide beam and a narrow beam including a discovery signal by beamforming, which is achieved by multiplying each antenna port by a predetermined weight. In addition, the signal transmission unit 202 transmits, based on designation from the candidate beam selecting unit 203, the measurement reference signal from the specified narrow beam. Further, based on the specification made by the beam control unit 204, the signal transmission unit 202 assigns, in response to the designated narrow beam, radio resources and the like for transmitting a data signal (e.g., PDSCH or the like) to the user apparatus 20.

The candidate beam selecting unit 203 selects one or more candidate narrow beams to be used for communication with the user apparatus 20 based on the reception quality of each of the narrow beams reported from the user apparatus 20 for a corresponding one of reception directions. For example, the candidate beam selecting unit 203 may select one of narrow beams with the best reception quality for each of the reception directions, or may select a predetermined number of narrow beams in descending order of reception quality for each of the reception directions. Further, in a case where narrow beams with good reception quality are present only in a specific reception direction, a predetermined number of narrow beams may be selected in descending order of reception quality, from among narrow beams received from a specific reception direction. Various methods or techniques may be considered for selecting one or more narrow candidate beams used for communication with the user apparatus 20. That is, the candidate beam selecting unit 203 may select candidate beams not only by employing the selection method described above, but also the candidate beam selecting unit 203 may select the candidate narrow beams by other selection methods.

In addition, the candidate beam selecting unit 203 instructs the signal transmission unit 202 to transmit the measurement reference signal(s) from one or more selected narrow beams. For example, the candidate beam selecting unit 203 may select antenna ports included in the small base station 11 as well as determining the weight to be multiplied for each antenna port so as to instruct the signal transmission unit 202 to transmit the measurement reference signal(s) from the selected one or more narrow beams.

The beam control unit 204 controls the antenna ports included in the small base station 11 based on the feedback information of the narrow beams received from the user apparatus 20 to thereby achieve MIMO spatial multiplexing using multiple narrow beams, transmission diversity, and the like. Further, the beam control unit 204 may sequentially switch (optimize) narrow beams used for communication according to traveling of the user apparatus 20 (performs beam tracking) based on feedback information of the narrow beam received from the user apparatus 20. Note that the above-described controls may be performed by linkage between the beam control unit 204 and the signal transmission unit 202.

The functional configurations of the user apparatus 20 and the small base station 11 may be entirely implemented by one, or two or more hardware circuits (e.g., one IC chip or multiple IC chips). Alternatively, a part of functional configurations of the small base station 11 and the user apparatus 20 may be formed by hardware circuits, and the remaining part may be implemented by a CPU and a program.

(User Apparatus)

Figure 9:
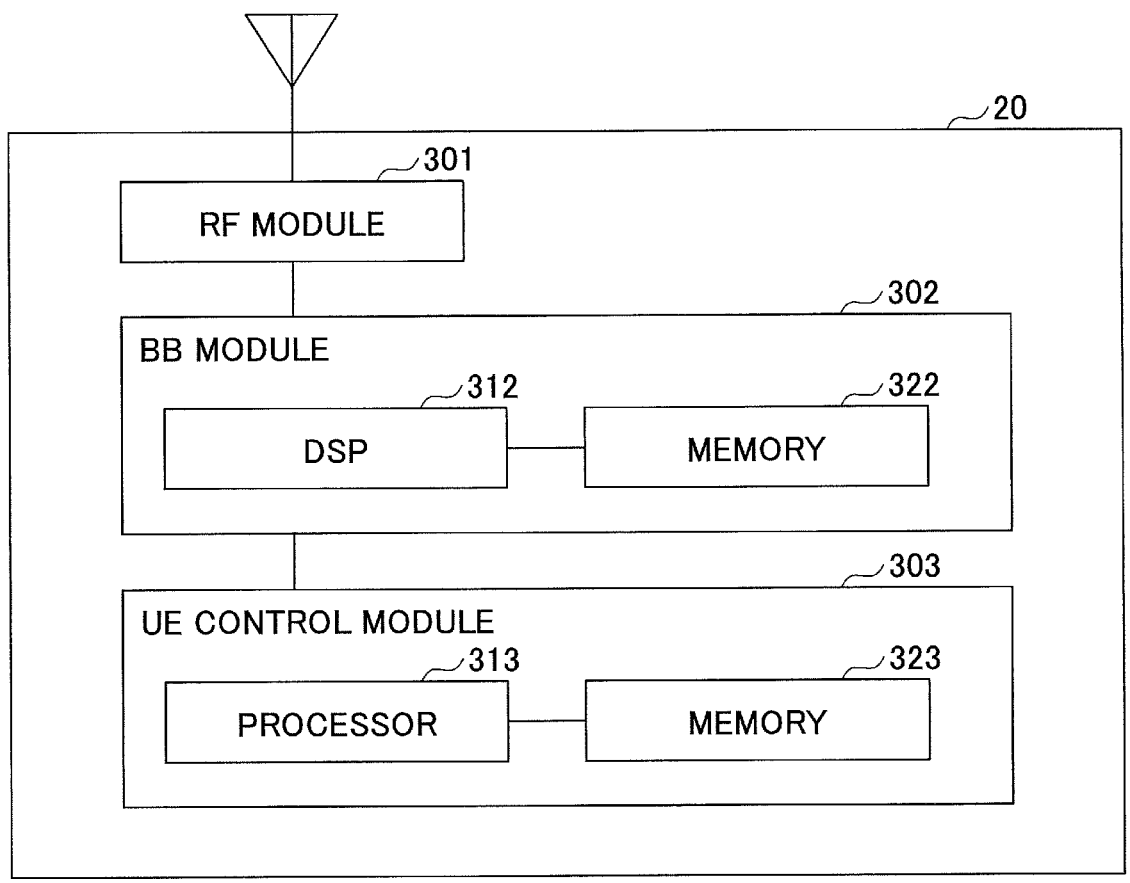
FIG. 9 is a diagram illustrating an example of a hardware configuration of a user apparatus according to an embodiment.

FIG. 9 is a diagram illustrating an example of a hardware configuration of a user apparatus according to an embodiment. FIG. 9 illustrates a configuration closer to the implemented example than the example illustrated in FIG. 7. As illustrated in FIG. 9, a user apparatus 20 includes an RF (Radio Frequency) module 301 configured to perform a process relating to radio signals, a BB (Base Band) process module 302 configured to perform a baseband signal process, and a UE control module 303 configured to perform a process of an upper layer and the like.

The RF module 301 performs D/A (Digital-to-Analog) conversion, modulation, frequency conversion, power amplification, etc., on a digital baseband signal received from the BB process module 302 to generate a radio signal to be transmitted from an antenna. The RF module 301 also performs frequency conversion, A/D (Analog to Digital) conversion, demodulation, etc., on the received radio signal to generate a digital baseband signal to transfer the generated digital baseband signal to the BB process module 302. The RF module 301 includes, for example, a part of the signal receiving unit 101 and a part of the signal transmission unit 102 illustrated in FIG. 7.

The BB process module 302 is configured to perform a process of mutually converting an IP packet and a digital baseband signal. A DSP (Digital Signal Processor) 312 is a processor configured to perform a signal process in the BB process module 302. The memory 322 is used as a work area of the DSP 312. The BB process module 302 includes, for example, a part of the signal receiving unit 101, a part of the signal transmission unit 102, a reception quality measuring unit 103, and a feedback information generating unit 104 illustrated in FIG. 7.

The UE control module 303 is configured to perform an IP layer protocol process, various types of application processes, and the like. The processor 313 is configured to perform a process performed by the UE control module 303. The memory 323 is used as a work area of the processor 313.

(Small Base Station)

Figure 10:
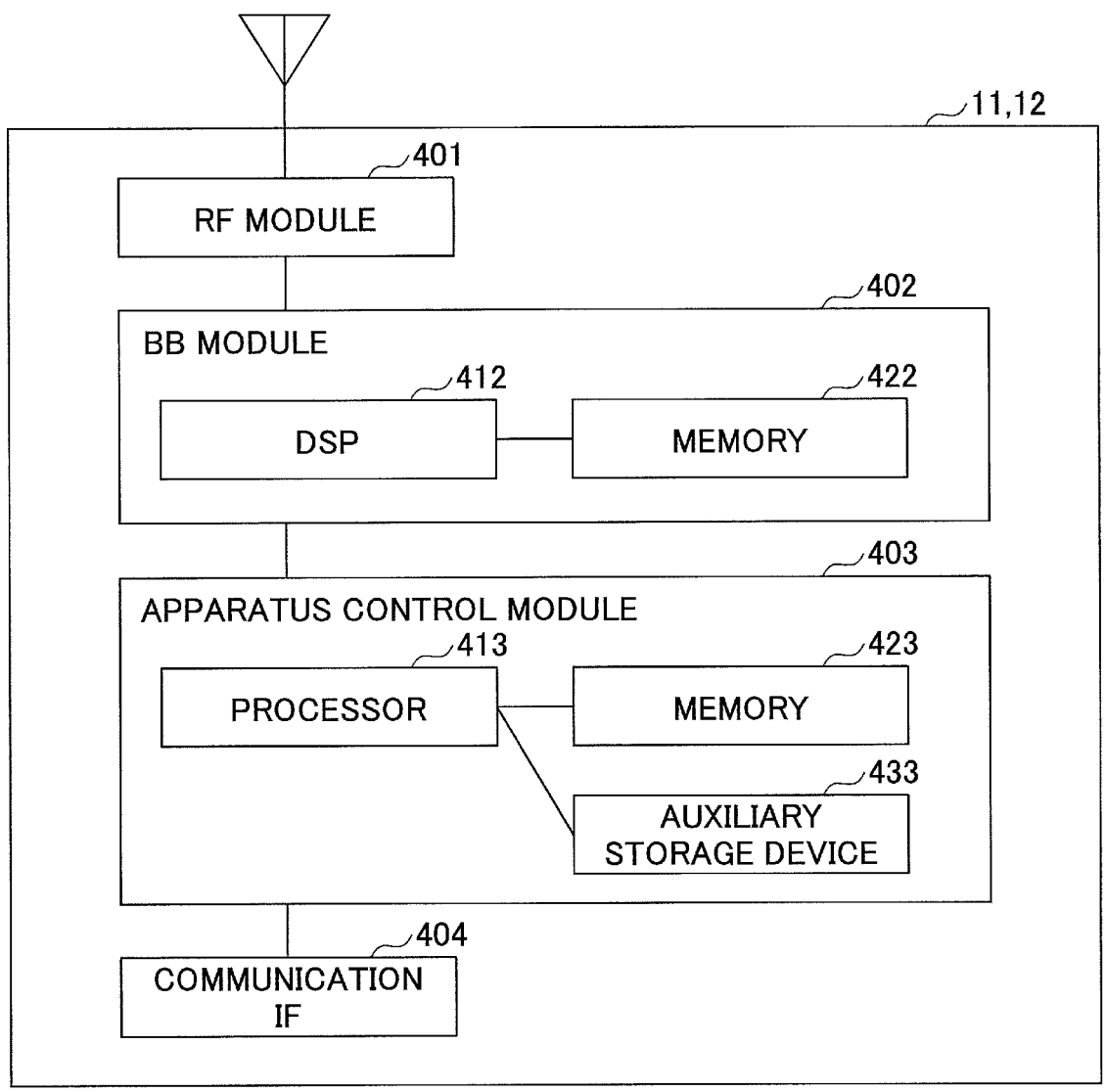
FIG. 10 is a diagram illustrating an example of a hardware configuration of a small base station according to an embodiment.

FIG. 10 is a diagram illustrating an example of a hardware configuration of a small base station according to an embodiment. FIG. 10 illustrates a configuration closer to the implemented example than the example illustrated in FIG. 8. As illustrated in FIG. 10, the small base station 11 includes an RF module 401 configured to perform a process relating to radio signals, a BB process module 402 configured to perform a baseband signal process, an apparatus control module 403 configured to perform a process of a higher layer and the like, and a communication IF 404 serving as an interface for connecting to a network.

The RF module 401 performs D/A conversion, modulation, frequency conversion, power amplification, etc., on a digital baseband signal received from the BB process module 402 to generate a radio signal to be transmitted from an antenna. The RF module 401 also performs frequency conversion, A/D conversion, demodulation, etc., on the received radio signal to generate a digital baseband signal to transfer the generated digital baseband signal to the BB process module 402. The RF module 401 includes, for example, a part of the signal receiving unit 201 and a part of the signal transmission unit 202 illustrated in FIG. 8.

The BB process module 402 is configured to perform a process of mutually converting an IP packet and a digital baseband signal. A DSP (Digital Signal Processor) 412 is a processor configured to perform a signal process in the BB process module 402. The memory 422 is used as a work area of the DSP 412. The BB process module 402 includes, for example, a part of the signal receiving unit 201, a part of the signal transmission unit 202, a part of the candidate beam selecting unit 203, and a part of the beam control unit 204 illustrated in FIG. 8.

The apparatus control module 403 is configured to perform an IP layer protocol process, an OAM (Operation and Maintenance) process, and the like. The processor 413 is configured to perform a process performed by the apparatus control module 403. The memory 423 is used as a work area of the processor 413. An auxiliary storage device 433 may, for example, be an HDD or the like, and is configured to store various configuration information and the like for the small base station 11 itself to operate. The apparatus control module 403 includes, for example, a part of the candidate beam selecting unit 203 and a part of the beam control unit 204 illustrated in FIG. 8.

<Process Flow>

(Measuring Method and Reporting Method of Reception Quality)

Figure 11:
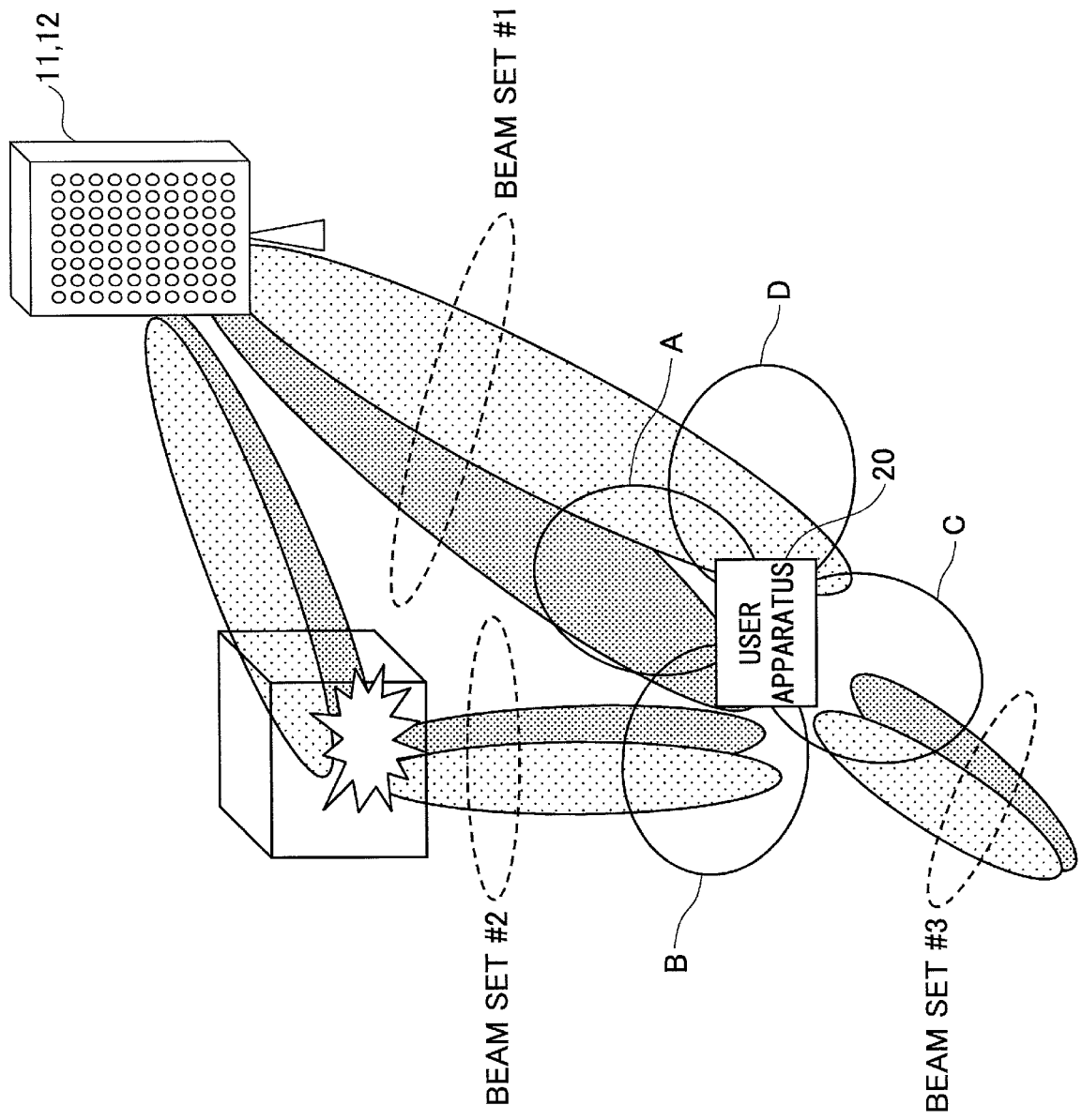
FIG. 11 is a diagram illustrating a method for measuring a discovery signal according to an embodiment.

FIG. 11 is a diagram illustrating a method for measuring a discovery signal according to an embodiment. As illustrated in FIG. 11, the user apparatus 20 measures, with respect to narrow beams arriving from different reception directions (A to D in FIG. 11), reception quality of a discovery signal of the narrow beam(s) for each of the reception directions, and reports measured results to the small base station 11.

The user apparatus 20 groups one or more narrow beams arriving from each of the reception directions into groups by reception direction. For example, the user apparatus 20 groups one or more narrow beams received from the reception direction A into a group as a beam set #1, groups one or more narrow beams received from the reception direction B into a group as a beam set #2, and groups one or more narrow beams received from the reception direction C into a group as a beam set #3. Although not illustrated in FIG. 11, if there is one or more narrow beams received from the reception direction D, these narrow beams are grouped into a group as a beam set #4.

By grouping narrow beams in the above-described manner, the small base station 11 may be enabled to determine whether the user apparatus 20 has received the reception quality of the discovery signal of each narrow beam in the same reception direction or in a different reception direction.

Note that the user apparatus 20 does not necessarily have to associate the reception directions A to D with the beam sets #1 to #4, respectively. For example, the user apparatus 20 may associate the beam set #1 with a reception direction in which narrow beams exhibit the best reception quality (reception power, etc.) among the discovery signals of all the narrow beams received from different reception directions. Further, the user apparatus 20 may associate the beam set #2 with a reception direction in which narrow beams exhibit a good reception quality (reception power, etc.). This is because even if the small base station 11 does not particularly identify a reception direction in which the narrow beam is received (e.g., whether the narrow beam is received in an upper direction or a right direction of a terminal), the small base station 11 capable of determining that the narrow beams are received in different reception directions may be enabled to select candidate narrow beams for use in downlink communication.

Figure 12:
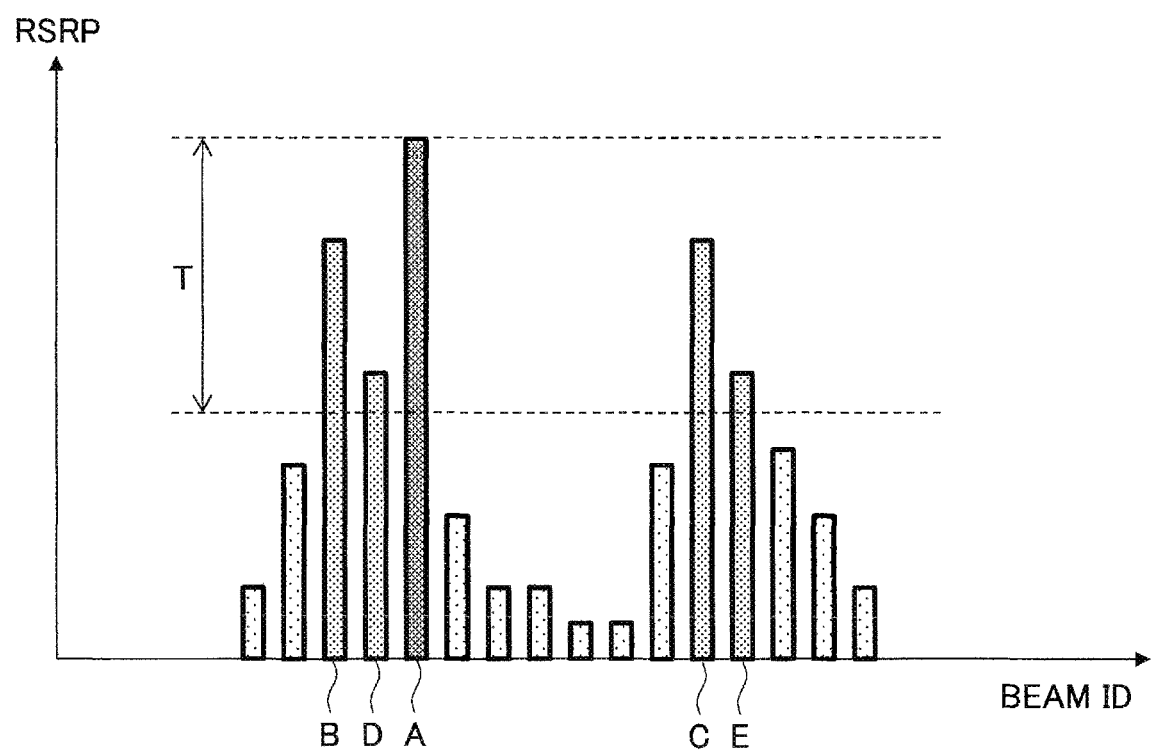
FIG. 12 is a diagram illustrating the number of narrow beams of which the user apparatus reports a reception quality.

FIG. 12 is a diagram illustrating the number of narrow beams of which the user apparatus reports the reception quality. For example, the user apparatus 20 may measure the reception quality of the discovery signal corresponding to one or more narrow beams grouped by reception direction, and may report, among the measured one or more reception qualities, only the reception quality that satisfies a predetermined condition, to the small base station 11. The user apparatus 20 may be enabled to reduce a data amount of signals to be transmitted from the user apparatus 20 to the small base station 11 by not reporting the reception quality associated with the narrow beams exhibiting poor reception quality (i.e., narrow beams that are unlikely to be finally used for communication).

The following illustrates specific examples of such a case with reference to FIGS. 11 and 12. In FIG. 12, a horizontal axis represents a beam ID uniquely identifying a narrow beam, and a vertical axis represents the magnitude of RSRP (Reference Signal Received Power). T represents a predetermined range. For example, FIG. 12 depicts an example of a measured result obtained by the user apparatus 20 that has measured the reception power (RSRP) of the discovery signal corresponding to multiple narrow beams received from the reception direction A in FIG. 11. For example, the user apparatus 20 selects a narrow beam ("A" in FIG. 12) having the highest reception power, and further selects narrow beams ("B" to "E" in FIG. 12) having the reception power within the predetermined range "T" from the reception power of the selected narrow beam "A". Subsequently, the user apparatus 20 transmits the reception power relating to the selected narrow beams A to E and the beam ID of each of the narrow beams to the small base station 11 together with information for identifying the group of the beam set #1.

Note that the predetermined range "T" may be set in advance in the user apparatus 20, or may be reported to the user apparatus 20 in advance using a control signal of a macrocell or broadcast information and the like.

Further, the user apparatus 20 may measure the reception quality of the discovery signal corresponding to one or more narrow beams grouped by reception direction, and may report only a predetermined number of reception qualities, among the measured one or more reception qualities, to the small base station 11. For example, when the predetermined number is "5", the user apparatus 20 transmits, to the base station 11, the reception quality relating to the five narrow beams in descending order of the reception quality, among the reception qualities relating to the multiple narrow beams received from the reception direction A.

Further, the user apparatus 20 may restrict the upper limit of the number of the overall reception qualities to be transmitted to the small base station 11. For example, the reception quality relating to the five narrow beams may be measured for a group of the beam set #1, the reception quality relating to six narrow beams may be measured for a group of the beam set #2, and the reception quality relating to seven narrow beams may be measured for a group of the beam set #3. In a case where the upper limit of the number of the reception qualities to be transmitted is 10, the user apparatus 20 may transmit, to the small base station 11, only the reception quality relating to 10 narrow beams in descending order of reception quality among the reception quality relating to those 18 narrow beams. According to the above-described configuration, it may be possible to reduce the data amount of the signals transmitted from the user apparatus 20 to the small base station 11.

(Processing Sequence)

Figure 13:
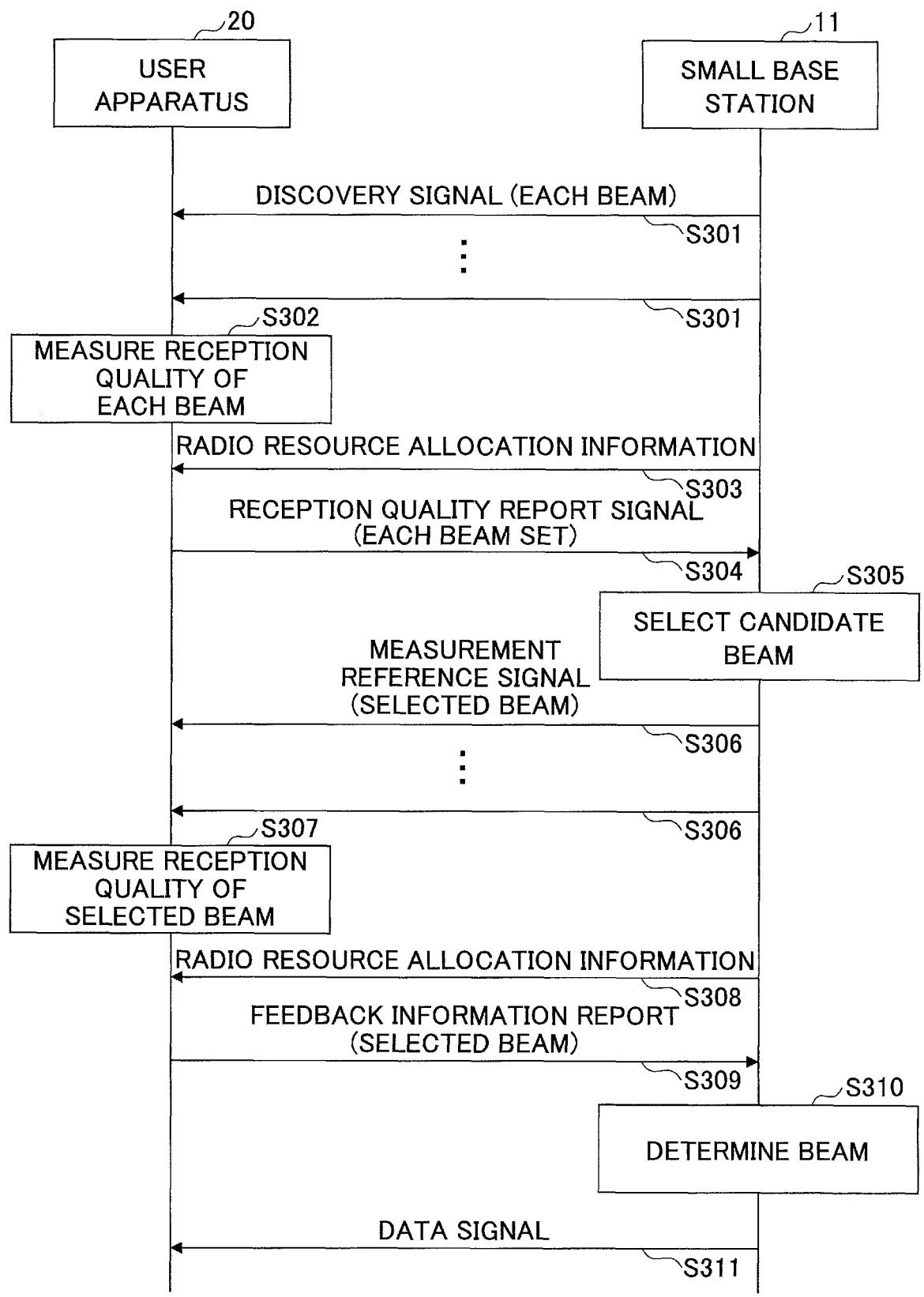
FIG. 13 is a diagram illustrating an example of a process sequence of a mobile communication system according to an embodiment.

FIG. 13 is a diagram illustrating an example of a process sequence of a mobile communication system according to an embodiment. The following illustrates, with reference to FIG. 13, a sequence of processes from discovery of a wide beam and a narrow beam by the user apparatus 20 to data transmission from the small base station 11 to the user apparatus 20. Note that in the following example, it is assumed that the user apparatus 20 has received macro auxiliary information from a macro base station in advance or holds auxiliary information corresponding to macro auxiliary information in advance. That is, the user apparatus 20 has obtained, in advance, information (frequency band, bandwidth, transmission timing of each discovery signal, series, etc.) for discovering a wide beam, and information relating to transmission timing and series etc., of a discovery signal corresponding to a narrow beam.

In step S301, the signal transmission unit 202 of the small base station 11, transmits, multiple pre-coded discovery signals forming a wide beam and multiple pre-coded discovery signals forming a narrow beam as described above.

In step S302, the signal receiving unit 101 of the user apparatus 20 receives discovery signals included in the wide beam based on the macro auxiliary information or auxiliary information corresponding to the macro auxiliary information, and performs frequency synchronization with the small base station 11, as well as performing timing synchronization (symbol synchronization, frame synchronization, etc.). In accordance with the discovery signals included in the wide beam, the user apparatus 20 may receive information (minimum system information, etc.) necessary for communication in the coverage of the small base station 11. Subsequently, the user apparatus 20 searches for discovery signals corresponding to the narrow beam according to the signal sequence specified by the discovery signals included in the wide beam to specify the beam ID of the narrow beam capable of receiving the discovery signals. For example, in a case where the discovery signal corresponding to the narrow beam has a format as illustrated in FIG. 6, the signal receiving unit 101 may be able to specify the beam ID, based on a receivable narrow beam OFDM symbol and a position of the subcarrier.

Subsequently, the reception quality measuring unit 103 of the user apparatus 20 measures the reception quality of the discovery signals corresponding to the receivable narrow beam. In this case, the reception quality measuring unit 103 may receive, from the reception direction detecting unit 111, the reception direction of the discovery signals of the detected narrow beam, or the reception direction detecting unit 111 may extract the reception direction to search for the discovery signals corresponding to the narrow beam. As a result, the user apparatus 20 may be enabled to specify the beam ID of the narrow beam receivable in each reception direction, and be enabled to measure the reception quality of the discovery signals corresponding to each narrow beam.

In step S303, the signal transmission unit 202 of the small base station 11 transmits, to the user apparatus 20, the information on the allocated radio resources in order for the user apparatus 20 to transmit the reception quality of the discovery signals corresponding to each narrow beam. Note that the process of step S303, may be performed by allowing the user apparatus 20 to request the small base station 11 to allocate uplink radio resources, for example, by a random access procedure or via PUCCH (Physical Uplink Control Channel), EPUCCH (Enhanced Physical Uplink Control Channel), and the like. Alternatively, the process of step S303 may be performed by allowing the user apparatus 20 to request the small base station 11 to allocate uplink radio resources, for example, via a macro base station. The small base station 11 may autonomously perform uplink radio resource allocation according to timing of transmitting the discovery signals in step S301.

In step S304, the signal transmission unit 102 of the user apparatus 20 reports the reception quality of the discovery signals corresponding to the narrow beam measured in step S302 by transmitting a reception quality report signal to the small base station 11. An uplink physical control channel (PUCCH/EPUCCH) or a random access channel (PRACH) defined in LTE may be used as an uplink channel via which the signal transmission unit 102 of the user apparatus 20 transmits the reception quality report signal; however, the uplink channel for transmitting the reception quality report signal is not restricted to these examples.

The following describes a signal format for use in the reception quality report signal.

FIG. 14 is a diagram illustrating an example of a configuration of a reception quality report signal. As illustrated in FIG. 14, the reception quality report signal includes "format information", "beam ID and reception quality (RSRP)" for each of the discovery signals corresponding to each narrow beam, and "CRC (Cyclic Redundancy Check)".

The "format information" is configured to store information including each of beam sets in association with the beam ID and the reception quality (RSRP) of each of the discovery signals corresponding to each of the narrow beams. The "CRC" is calculated by masking (e.g., XOR masking) a CRC calculated based on the format information and the beam ID and reception quality (RSRP) of the discovery signals corresponding to the narrow beams with the UE ID (e.g., C-RNTI: Cell-Radio Network Temporary Identifier) that identifies the user apparatus 20.

That is, the "format information" corresponds to header information and the "beam ID and reception quality (RSRP)" corresponds to a data portion.

Note that the signal transmission unit 102 of the user apparatus 20 encodes the reception quality report signal illustrated in FIG. 14 and transmits the encoded reception quality report signal to the user apparatus 20. In this example, a joint coding method that encodes the "format information", "beam ID and reception quality (RSRP)" and "CRC" as a set may be considered as a coding method.

Further, a separate coding method that separately encodes the "format information", "beam ID and reception quality (RSRP)", and "CRC" respectively may be considered as an alternative coding method. With this method, the small base station 11 may be enabled to refer to the header information ("format information") separately from the data portion ("beam ID and reception quality (RSRP)").

FIGS. 15A to 15D include diagrams illustrating an example of format information. As illustrated in FIG. 15, the format information may have several formats. The format information of FIG. 15A stores "number of beam sets" first, and subsequently stores the "number of beams in the beam set #N" repeatedly according to the number of beam sets. For example, in the format information of FIG. 15A, when the "number of beam sets" is 2, the "number of beams in the beam set #1" is 2, and the "number of beams in the beam set #2" is 3, among five "beam IDs and reception qualities" subsequently stored subsequently to the format information, the first two "beam IDs and reception qualities" are information on beam set #1, and the next three "beam IDs and reception qualities" are information on beam set #2. According to the format information of FIG. 15A, the size of format information may increase; however, the format information of FIG. 15A has an advantage that there is no limitation in the number of beam sets to be stored.

Next, the format information of FIG. 15B stores the "number of beams in the beam set #1" and the "number of beams in the beam set #2". In a case where the format information of FIG. 15B is employed, the user apparatus 20 may only report information on two beam sets; however, the user apparatus 20 has an advantage of preventing the format size from becoming unlimitedly large. Note that in a case where the format information of FIG. 15B is employed, and there is only one beam set to be reported from the user apparatus 20 (i.e., when narrow beams are received only in a specific reception direction), the user apparatus 20 may set "zero" to the "number of beams in the beam set #2". Further, the format information of FIG. 15B may be configured to store information on three or more beam sets. For example, the format information of FIG. 15B may be configured to store the "number of beams in the beam set #1", the "number of beams in the beam set #2" and the "number of beams in the beam set #3".

Subsequently, the format information of FIG. 15C stores the "total number of beams" and the "number of beams in the beam set #1". In the format information of FIG. 15C, the number of beams in set #2 may be obtained by calculation of 'the "total number of beams"—the "number of beams in the beam set #1"'. Further, when the same number is set in each of the "total number of beams" and the "number of beams in the beam set #1", there is only one beam set reported from the user apparatus 20. Similar to the example of FIG. 15B, the format information of FIG. 15C has an advantage of preventing the format size from becoming unlimitedly large although the user apparatus 20 may only report information on two beam sets.

Subsequently, the format information of FIG. 15D stores the "number of beam sets" and the "total number of beams". For example, when the "number of beam sets" is 3 and the "total number of beams" is 9, the reception quality report signal includes three "beam IDs and reception qualities" are stored for each of the beam set. In a case where the format information of FIG. 15D is employed, the user apparatus 20 needs to apply the same number of "beam IDs and reception qualities" to be reported for each of the beam sets. In this case, the user apparatus 20 has an advantage of being able to report information on multiple beam sets as well as having an advantage of preventing the format size from becoming unlimitedly large.

Subsequently, a modification of a signal format for use in the reception quality report signal will be described. FIG. 16 includes diagrams illustrating a modification of a configuration of the reception quality report signal. As illustrated in FIG. 16, the reception quality report signal includes the "format information", the "beam set ID" for identifying each of the beam sets (#1 to #N), the "beam ID and reception quality (RSRP)" for each of the discovery signals corresponding to each of the narrow beams, and the "CRC".

The "format information" is configured to store information indicating how many of the beam IDs and the reception qualities (RSRP) of each of the discovery signals corresponding to each of the narrow beams are stored in the reception quality report signal. The "CRC" is calculated by masking (e.g., XOR masking) a CRC calculated based on the format information, the beam set ID, and the beam ID and reception quality (RSRP) of each of the discovery signals corresponding to each narrow beam with the UE ID (e.g., C-RNTI:) that identifies the user apparatus 20.

That is, the "format information" corresponds to header information and the "beam set ID" and "beam ID and reception quality (RSRP)" correspond to a data portion.

Note that the signal transmission unit 102 of the user apparatus 20 encodes the reception quality report signal illustrated in FIG. 16 and transmits the encoded reception quality report signal to the user apparatus 20. In this example, a joint coding method that encodes the "format information", "beam set ID", "beam ID and reception quality (RSRP)" and "CRC" as a set may be considered as a coding method.

Further, a separate coding method that separately encodes the "format information", "beam ID and reception quality (RSRP)", and "CRC" respectively may be considered as an alternative coding method. With this method, the small base station 11 may be enabled to refer to the header information ("format information") separately from the data portion ("beam set ID" and "beam ID and reception quality (RSRP) ").

FIGS. 17A and 17B include diagrams illustrating an example of a modification of the format information. The format information illustrated in FIGS. 17A and 17B may be applied, for example, when the reception quality report signal has a configuration as illustrated in FIG. 16. As illustrated in FIGS. 17A and 17B, the format information may have several formats. The format information of FIG. 17A may first store the "total number of beams". For example, in the format information of FIG. 17A, when "the total number of beams" is 4, the number of pairs of "beam set ID" and "beam ID and reception quality" stored following the format information is 4. The modified example of FIG. 17A has an advantage of preventing the size of the format information from becoming unlimitedly large.

Subsequently, the format information of FIG. 17D stores the "total number of beams" and the "number of beam sets". For example, in the format information of FIG. 17B, in a case where the "total beam number" is 4 and the "number of beam sets" is 2, the number of pairs of "beam set ID" and "beam ID and reception quality" stored subsequently to the format information is 4, and the "beam ID and reception quality" in each of the two beam sets is included in the reception quality report signal. Similar to the modified example of FIG. 17A, the format information of FIG. 17B has an advantage of preventing the size of the format information from becoming unlimitedly large. The subsequent illustration is given below by referring back to FIG. 13.

In step S305, the candidate beam selecting unit 203 of the small base station 11 selects one or more candidate beams to be used for communication with the user apparatus 20, based on the reception quality of the discovery signal corresponding to the narrow beam stored in the reception quality report signal received in step S304. In this case, the candidate beam selecting unit 203 sequentially selects the narrow beams one by one from each of the beam sets included in the reception quality report signal in order of the reception quality, that is, in order from one having the best reception quality (reception power, etc.). Specifically, the candidate beam selecting unit 203 selects one narrow beam with the best reception quality from the multiple narrow beams reported as the beam set #1, and subsequently selects one narrow beam with the best reception quality from the multiple narrow beams reported as the beam set #2. The candidate beam selecting unit 203 may select three or more narrow beams by repeating such processes.

Note that the candidate beam selecting unit 203 may further use an SRS (Sounding Reference Signal) received from the user apparatus 20 when selecting one or more narrow candidate beams used for communication with the user apparatus 20.

In step S306, the signal transmission unit 202 of the small base station 11 transmits the measurement reference signal via the narrow beam selected in step S305.

In step S307, the feedback information generating unit 104 of the user apparatus 20 generates feedback information based on the measured result obtained from the measurement reference signal corresponding to each narrow beam. The feedback information may, as described above, include a CSI such as Rank Indicator (RI), Precoding Matrix Indicator (PMI), Channel Quality Indicator (CQI), or the like.

In step S308, the signal transmission unit 202 of the small base station 11 transmits, to the user apparatus 20, the information on the allocated radio resources in order for the user apparatus 20 to transmit the feedback information. Note that in step S308, the user apparatus 20 may request the small base station 11 to allocate the uplink radio resource by the random access procedure or PUCCH, EPUCCH, etc., in a manner similar to step S303, for example. The small base station 11 may autonomously perform uplink radio resource allocation according to timing of transmitting the discovery signals in step S306.

In step S309, the signal transmission unit 102 of the user apparatus 20 transmits the feedback information generated in step S307 to the small base station 11. An uplink physical control channel (PUCCH/EPUCCH) or a random access channel (PRACH) defined in LTE may be used as an uplink channel via which the signal transmission unit 102 of the user apparatus 20 transmits the feedback information; however, the uplink channel for transmitting the feedback information is not restricted to these examples.

In step S310, the beam control unit 204 of the small base station 11 determines a narrow beam used for transmitting downlink data to the user apparatus 20 based on the feedback information received in step S309.

In step S311, the beam control unit 204 and the signal transmission unit 202 of the small base station 11 performs scheduling based on the feedback information, determines a beam, rank, MCS (modulation and coding scheme), resources, etc., suitable for the user apparatus 20, and appropriately controls the antenna port to transmit a data signal to the user apparatus 20.

Note that in the mobile communication system according to the embodiment, when the reception direction of the discovery signal is detected in steps S302 to S304 illustrated in FIG. 13, a specific directivity pattern in which a discovery signal is received, or a specific antenna port via which the discovery signal is received may be recognized.

Note that in the mobile communication system according to the embodiment, steps S301 to S305 illustrated in FIG. 13 may be repeatedly performed at predetermined intervals. As a result, the small base station 11 may be enabled to optionally change one or more narrow candidate beams used for communication with the user apparatus 20.

Further, in the mobile communication system according to the embodiment, steps S306 to S311 illustrated in FIG. 13 may be repeatedly performed at predetermined intervals. For example, the small base station 11 may repeat the process of steps S306 to S311 to optionally change (switch) the narrow beams used for transmitting the downlink data to the user apparatus 20 sequentially based on the feedback information corresponding to the multiple narrow beams. Further, the interval at which the process of steps S306 to S311 illustrated in FIG. 13 is repeated and the interval at which the process of steps S306 to S311 is repeated may be different time intervals.

In the mobile communication system according to the embodiment, the format information may be transmitted to the user apparatus 20 together with the radio resource allocation information in step S303 illustrated in FIG. 13. In this case, the signal transmission unit 202 of the small base station 11 may transmit the format information illustrated in FIG. 18A to the user apparatus 20, and in step S304, the signal transmission unit 102 of the user apparatus 20 may transmit, to the small base station 11, the reception quality report signal having the format illustrated in FIG. 18B according to the format information received in step S303. Note that the format information illustrated in FIG. 18A may be the same as the format information illustrated in FIGS. 15A to 15D, for example.

Further, the user apparatus 20 and the small base station 11 may obtain in advance information on the configuration of the format information of FIG. 18A. The mobile communication system having such a configuration may be enabled to save a time for transmitting the format information between the user apparatus 20 and the small base station 11 as well as reducing the amount of data transmitted and received between the user apparatus 20 and the small base station 11.

In the mobile communication system according to another embodiment, the format information may be transmitted to the user apparatus 20 together with the radio resource allocation information in step S303 illustrated in FIG. 13. In this case, the signal transmission unit 202 of the small base station 11 may transmit the format information illustrated in FIG. 19A to the user apparatus 20, and in step S304, the signal transmission unit 102 of the user apparatus 20 may transmit, to the small base station 11, the reception quality report signal having the format illustrated in FIG. 19B according to the format information received in step S303. Note that the format information illustrated in FIG. 19A may be the same as the format information illustrated in FIG. 17A or 17B, for example.

Figure 19A:
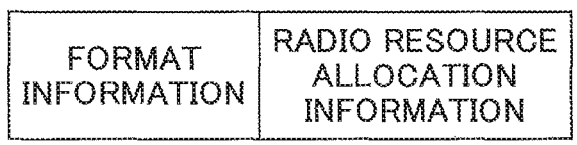
FIG. 19A and FIG. 19B include diagrams illustrating an example of a modification (part 1) of a signal in a case where format information is reported from a base station.
Figure 19B:
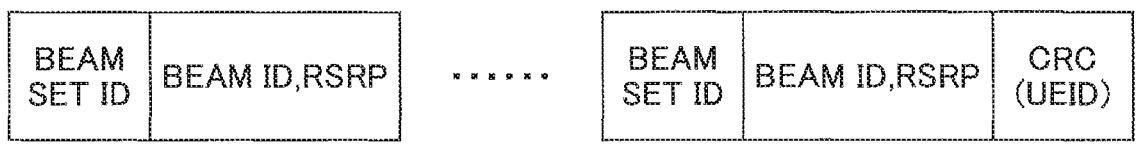

Further, the user apparatus 20 and the small base station 11 may obtain in advance information on the configuration of the format information of FIG. 19A. The mobile communication system having such a configuration may be enabled to save a time for transmitting the format information between the user apparatus 20 and the small base station 11 as well as reducing the amount of data transmitted and received between the user apparatus 20 and the small base station 11.

In the mobile communication system according to still another embodiment, the format information may be transmitted to the user apparatus 20 together with the radio resource allocation information in step S303 illustrated in FIG. 13. In such a case, the signal transmission unit 202 of the small base station 11 may transmit the format information illustrated in FIG. 20A to the user apparatus 20, for example. In step S304, the signal transmission unit 102 of the user apparatus 20 may transmit a reception quality report signal having, for example, a format illustrated in FIG. 20B to the small base station 11 according to the format information received in step S303. The "total number of beams" may be stored in the format information illustrated in FIG. 20A, and the "number of beam sets" may be stored in the format information illustrated in FIG. 20B For example.

(Transmission Method of Reception Quality Reporting Signal and Transmitting Feedback Information)

FIGS. 21A and 21B include diagrams illustrating a method for transmitting a reception quality report signal and feedback information. The following illustrates, with reference to FIG. 21, a transmission method when the reception quality report signal and the feedback information are transmitted from the user apparatus 20 to the small base station 11. First, FIG. 21A gives schematic representation of how the reception quality report signal and feedback information are separately transmitted. As illustrated in FIG. 21A, compared to the feedback information, the user apparatus 20 may transmit the reception quality report signal to the small base station 11 at a relatively long cycle.

Next, FIG. 21B gives schematic representation of how the reception quality report signal and the feedback information are simultaneously transmitted at the timing at which the reception quality report signal is transmitted. As illustrated in FIG. 21B, the signal transmission unit 102 of the user apparatus 20 may transmit a reception quality report signal by including feedback information to the small base station 11 at the timing at which the reception quality report signal is transmitted.

In the following, an illustration is given of a configuration example of the format information in a case where feedback information is included in the reception quality report signal.

FIGS. 22A to 22D include diagrams illustrating an example of format information to which a report pattern is attached. The format information items illustrated in FIGS. 22A to 22D each includes a "report pattern" in addition to a corresponding one of the format information illustrated in FIGS. 15A to 15D. The "report pattern" includes information (a flag) for identifying whether the reception quality report signal includes only the reception quality of the discovery signal corresponding to the narrow beam or whether the reception quality report signal includes both the reception quality of the discovery signal corresponding to the narrow beam and the feedback information.

The information may, for example, be composed of 2 bits so as to indicate four patterns. For example, in a case where "00" is set for the "report pattern", the "report pattern" having the setting of "00" may indicate that the reception quality report signal includes only the reception quality of the discovery signal corresponding to the narrow beam. Likewise, in a case where "01" is set for the "report pattern", the "report pattern" having the setting of "01" may indicate that the reception quality report signal includes both the reception quality of the discovery signal corresponding to the narrow beam and the feedback information.

Note that each format information item illustrated in FIGS. 22A to 22D may be used for reporting feedback information. For example, the format information illustrated in FIGS. 22A to 22D may be provided with a flag (e.g., "10") indicating that only the "feedback information" is included in the "report pattern" and the format information having such a flag may be added to a header portion of the feedback information. In this case, zero may be stored in the "number of beam sets", the "number of beams in beam set #N" and the "total number of beams" included in the format information. As a result, formats of the signals transmitted from the user apparatus 20 to the small base station 11 may be standardized, thereby reducing processing load on the user apparatus 20 and the small base station 11.

Note that the above-described configurations of the "report pattern" are examples, and the "report pattern" may employ other configurations.

FIGS. 23A and 23B include diagrams illustrating a modification of format information to which a report pattern is attached. The format information items illustrated in FIGS. 23A and 23B each include a "report pattern" in addition to a corresponding one of the format information items illustrated in FIGS. 17A and 17B. The information (flag) included in the "report pattern" is the same as that in FIGS. 22A to 22D, and a description of the flag information will thus be omitted. Similar to FIGS. 22A to 22D, each format information item illustrated in FIGS. 23A and 23B may be used for reporting feedback information.

(Transmission Method of Discovery Signal)

The following illustrates a transmission method of a discovery signal corresponding to a narrow beam transmitted by the signal transmission unit 202 of the small base station 11.

FIGS. 24A to 24D include diagrams illustrating an example of a method for transmitting a discovery signal corresponding to a narrow beam. In FIGS. 24A to 24D, a horizontal axis represents time and a vertical axis represents frequency. Further, "H" indicates horizontally polarized waves, and "V" indicates vertically polarized waves. The same shading indicates a discovery signal corresponding to the same narrow beam (i.e., a narrow beam having the same beam ID). Further, in FIG. 24, a transmission timing of each discovery signal is not particularly specified; however, a discovery signal may be transmitted at a predetermined cycle, for example.

Figure 24A:
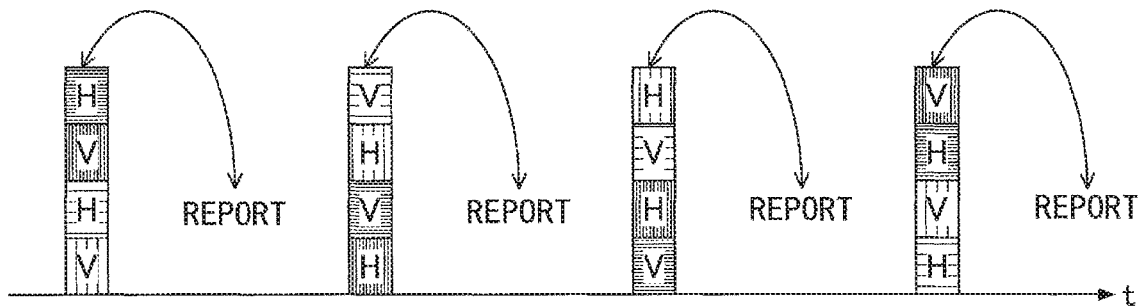
FIG. 24A, FIG. 24B, FIG. 24C, and FIG. 24D include diagrams illustrating an example of a method for transmitting a discovery signal corresponding to a narrow beam.

FIG. 24A is illustrated first. As illustrated in FIG. 24A, the signal transmission unit 202 transmits, at each transmission timing, a discovery signal corresponding to the same narrow beam, for example, by frequency hopping. The user apparatus 20 transmits the reception quality with respect to the discovery signal to the small base station 11 at each transmission timing. In other words, the example of FIG. 24A illustrates that a transmission timing of the discovery signal (step S301 in FIG. 13) is associated with a reporting timing of the reception quality (step S304 in FIG. 13) on a one-to-one basis between the small base station 11 and the user apparatus 20.

Figure 24B:
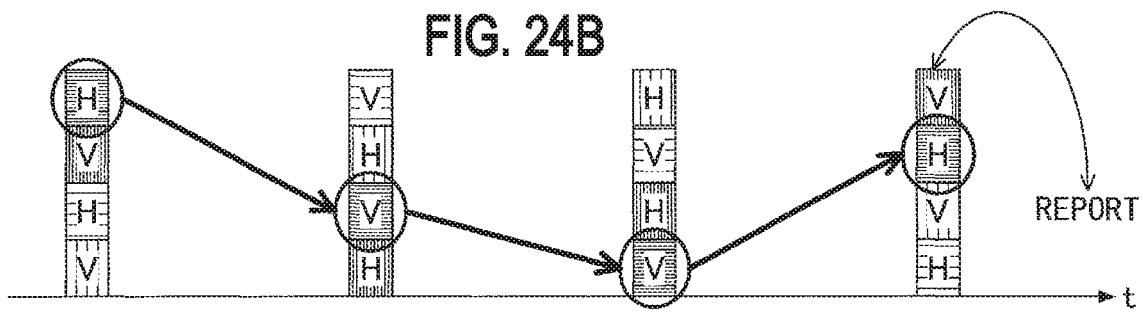

Next, FIG. 24B is described. As illustrated in FIG. 24B, the signal transmission unit 202 transmits, at each transmission timing, a discovery signal corresponding to the same narrow beam by performing frequency hopping. Further, the user apparatus 20 measures the reception quality based on the discovery signals received at multiple timings, and transmits the measured reception quality to the small base station 11.

Figure 24C:
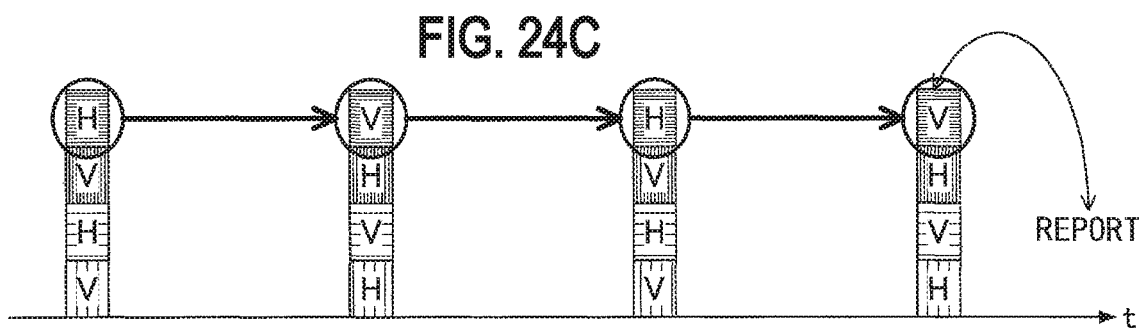

Next, FIG. 24C is described. As illustrated in FIG. 24C, the signal transmission unit 202 transmits, at each transmission timing, a discovery signal corresponding to the same narrow beam via the same frequency (subcarrier) without performing frequency hopping. Further, the user apparatus 20 measures the reception quality based on the discovery signals received at multiple timings, and transmits the measured reception quality to the small base station 11.

Figure 24D:
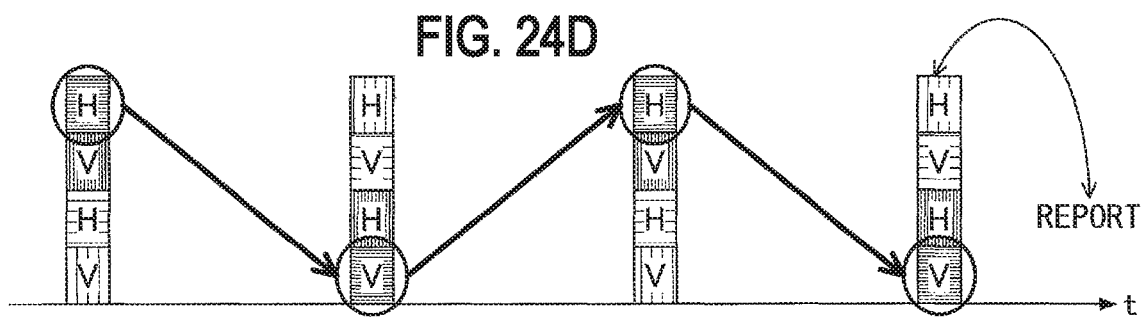

Next, FIG. 24D is described. As illustrated in FIG. 24D, the signal transmission unit 202 transmits, at each transmission timing, a discovery signal corresponding to the same narrow beam, for example, by performing frequency hopping with mirroring as used in PUSCH transmission in LTE. That is, the discovery signal corresponding to the same narrow beam is transmitted at the same frequency (subcarrier) in a fixed cycle. Further, the user apparatus 20 measures the reception quality based on the discovery signals received at multiple timings, and transmits the measured reception quality to the small base station 11.

In accordance with the above-described methods of FIGS. 24B to 24D, the reception quality may be measured from the discovery signals received at multiple timings. Accordingly, it is possible to measure the reception quality with high accuracy while eliminating an adverse effect of noise included in the discovery signals. Further, in accordance with the methods of FIGS. 24B and 24D, the frequency hopping of a discovery signal enables a user terminal to measure the reception quality with high accuracy while eliminating an adverse effect of the frequency. Moreover, in accordance with the methods of FIGS. 24B and 24D, since the discovery signal is transmitted with different polarization (vertically polarized wave and horizontally polarized wave), the user terminal may measure the reception quality with high accuracy.

In the present embodiment, a discovery signal corresponding to the narrow beam may be transmitted by other methods differing from those methods illustrated in FIG. 24.

<Effect>

As described above, according to the embodiment, there is provided a user apparatus communicating with a base station of a radio communication system including the base station and the user apparatus. The user apparatus includes a first receiving unit configured to receive a plurality of first reference signals transmitted from the base station; a detection unit configured to detect a specific antenna port via which the plurality of first reference signals is received, or a specific directivity pattern, among a plurality of directivity patterns generated by a plurality of antenna ports, in which the plurality of first reference signals are received; a measuring unit configured to measure reception power of each of the plurality of first reference signals; and a transmission unit configured to group the reception power of each of the plurality of first reference signals into one of groups of the specific antenna port and the specific directivity pattern via which the plurality of first reference signals are received to transmit the groups of the reception power to the base station.

By the user apparatus 20, in the radio communication system having the base station performing beam forming and the user apparatus, it is enabled to appropriately select a plurality of beams used for communication, from a plurality of beams formed by the base station.

In addition, the user apparatus may transmit, to the base station, header information indicating a number corresponding to the plurality of first reference signals belonging to a corresponding one of the groups. By transmitting such header information to the small base station 11, the small base station 11 may be enabled to group the plurality of first reference signals by direction in which the plurality of first reference signals are received by the user apparatus 20.

The first transmission unit may group the reception power of each of the plurality of first reference signals satisfying a predetermined condition into the groups and transmit the groups to the base station. As a result, it may be possible to reduce a data amount for use in reporting the reception power from the user apparatus 20 to the small base station 11.

The user apparatus may further include a second receiving unit configured to receive one or more of second reference signals transmitted from the base station; and a generating unit configured to measure a reception quality of the one or more second reference signals to generate feedback information based on the reception quality. In the user apparatus having the above configuration, the transmission unit may transmit the reception power of each of the plurality of first reference signals and the feedback information simultaneously to the base station. As a result, the user apparatus 20 may be enabled to collectively transmit the reception power of the discovery signal corresponding to the narrow beam and the feedback information to the small base station 11, and to reduce the number of signals transmitted and received between the user apparatus 20 and the small base station 11.

Further, the first transmission unit may receive, from the base station, header information indicating the number of the plurality of first reference signals belonging to the corresponding groups, and group the reception power of each of the plurality of first reference signals into the groups based on the received header information to transmit the groups of the reception power to the base station. As a result, the small base station 11 may be enabled to designate a signal format for causing the user apparatus 20 to report the reception power of each of the plurality of first reference signals.

In addition, the first receiving unit may receive the plurality of frequency hopped first reference signals from the base station. Further, the measuring unit may calculate the reception power of each of the plurality of first reference signals to be transmitted to the base station by measuring the reception power of a corresponding one of the plurality of first reference signals a plurality of times. As a result, the user apparatus 20 may be enabled to measure the reception power with higher accuracy.

In addition, according to the embodiment, there is provided a base station communicating with a user apparatus in a radio communication system including the base station and the user apparatus. The base station includes a first transmission unit configured to transmit a plurality of first reference signals; a first receiving unit configured to receive, from the user apparatus, the reception power of each of the plurality of first reference signals grouped into a plurality of groups; a selection unit configured to select one of antenna ports for transmitting one or more second reference signals based on the reception power of each of the plurality of first reference signals grouped into the plurality of groups; a second transmission unit configured to transmit the one or more second reference signals from the antenna port selected by the selecting unit; a second receiving unit configured to receive, from the user apparatus, feedback information based on reception quality of each of the one or more second reference signals; and a control unit configured to control the antenna port based on the feedback information.

The small base station 11 having the above configuration may be enabled to appropriately select a plurality of beams used for communication, from among a plurality of beams formed by the base station, in a radio communication system having the base station performing beam forming and the user apparatus.

Note that each "unit" in the configuration of each of the above apparatuses may be replaced with a "part", a "circuit", a "device", or the like.

Supplementary Description of Embodiment

The embodiments have been described as described above; however, the disclosed invention is not limited to these embodiments, and a person skilled in the art would understand various variations, modifications, replacements, or the like. Specific examples of numerical values have been used for encouraging understanding of the present invention; however, these numeric values are merely examples and, unless otherwise noted, any appropriate values may be used. In the above description, partitioning of items is not essential to the present invention. Provisions described in more than two items may be combined if necessary. Provisions described in one item may be applied to provisions described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. For the sake of convenience, the user apparatus and the base station have been described by using functional block diagrams. These apparatuses may be implemented by hardware, by software, or by combination of both. The software which is executed by a processor included in a user apparatus according to an embodiment and the software which is executed by a processor included in a base station may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium. The present invention is not limited to the above-described embodiments and modifications, and may incorporate variations, alterations, corrections, substitutions, and the like without departing from the spirit of the present invention.

Note that in the above embodiments, a discovery signal is an example of a first reference signal. Further, a measurement reference signal is an example of a second reference signal. The signal receiving unit 101 is an example of a first receiving unit and a second receiving unit. The reception direction detecting unit 111 is an example of a detecting unit. The reception quality measuring unit 103 is an example of a measuring unit. The signal transmission unit 102 is an example of a first transmission unit and a second transmission unit. The format information is an example of header information. The signal receiving unit 201 is an example of a first receiving unit and a second receiving unit. The signal transmission unit 202 is an example of a first transmission unit and a second transmission unit. The candidate beam selecting unit 203 is an example of a selection unit. The beam control unit 204 is an example of a control unit.

DESCRIPTION OF REFERENCE SIGNS 10 macro base station
11 small base station
12 small base station
20 user apparatus
101 signal receiving unit
102 signal transmission unit
103 reception quality measuring unit
104 feedback information generating unit
111 reception direction detecting unit
201 signal receiving unit
202 signal transmission unit
203 candidate beam selecting unit
204 beam control unit
301 RF module
302 BB process module
303 UE control module
401 RF module
402 BB process module
403 apparatus control module
404 communication IF

The invention claimed is:
1. A terminal comprising:
a receiver that receives format information indicating a configuration for reporting a measurement result of received power; and
a transmitter that transmits, based on the format information, a report including the measurement result of the received power measured using a synchronization signal,
wherein the transmitter includes an identifier for the synchronization signal in the report of the measurement result of the received power.
2. The terminal according to claim 1,
wherein the format information specifies a report in which the measurement result of the received power is grouped.
3. The terminal according to claim 1,
wherein the format information indicates a number of results of measurement of the received power to be included.
4. A communication method by a terminal, the method comprising:
receiving format information indicating a configuration for reporting a measurement result of received power; and
transmitting, based on the format information, a report including the measurement result of the received power measured using a synchronization signal,
wherein the report of the measurement result of the received power includes an identifier for the synchronization signal.
5. A base station comprising:
a transmitter that transmits format information indicating a configuration for reporting a measurement result of received power; and
a receiver that receives, based on the format information, a report including the measurement result of the received power measured using a synchronization signal,
wherein the report of the measurement result of the received power includes an identifier for the synchronization signal.
6. A radio communication system comprising:
a base station; and
a terminal,
wherein the base station includes:
a transmitter that transmits format information indicating a configuration for reporting a measurement result of received power; and
a receiver that receives, based on the format information, a report including the measurement result of the received power measured using a synchronization signal, and
wherein the terminal includes:
a receiver that receives the format information indicating the configuration for reporting the measurement result of received power; and
a transmitter that transmits, based on the format information, the report including the measurement result of the received power measured using the synchronization signal,
wherein the transmitter includes an identifier for the synchronization signal in the report of the measurement result of the received power.

* * * * *